(12) United States Patent
Nakahara et al.

(10) Patent No.: US 8,891,342 B2
(45) Date of Patent: Nov. 18, 2014

(54) OPTICAL HEAD DEVICE AND OPTICAL DISC DEVICE

(71) Applicants: Hironori Nakahara, Tokyo (JP); Toshiya Matozaki, Tokyo (JP); Nobuo Takeshita, Tokyo (JP)

(72) Inventors: Hironori Nakahara, Tokyo (JP); Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/362,865

(22) PCT Filed: Oct. 11, 2012

(86) PCT No.: PCT/JP2012/076341
§ 371 (c)(1),
(2), (4) Date: Jun. 4, 2014

(87) PCT Pub. No.: WO2013/084588
PCT Pub. Date: Jun. 13, 2013

(65) Prior Publication Data
US 2014/0313874 A1    Oct. 23, 2014

(30) Foreign Application Priority Data
Dec. 5, 2011 (JP) ................... 2011-265778

(51) Int. Cl.
*G11B 7/00* (2006.01)
*G11B 7/13* (2012.01)
*G11B 7/09* (2006.01)
*G11B 7/1353* (2012.01)

(52) U.S. Cl.
CPC .................... *G11B 7/1353* (2013.01)
USPC .............. 369/53.23; 369/44.41; 369/44.42; 369/110.03; 369/112.06; 369/112.11

(58) Field of Classification Search
None
See application file for complete search history.

(56) References Cited

U.S. PATENT DOCUMENTS

| 8,472,300 B2 | 6/2013 | Shinoda et al. |
| 8,483,022 B2 | 7/2013 | Nakahara |
| 2004/0202093 A1* | 10/2004 | Ma et al. .................. 369/124.14 |
| 2008/0084797 A1 | 4/2008 | Sano et al. |
| 2008/0165655 A1 | 7/2008 | Saitoh et al. |

(Continued)

FOREIGN PATENT DOCUMENTS

| JP | 8-063778 A | 3/1996 |
| JP | 2008-135151 A | 6/2008 |

(Continued)

*Primary Examiner* — Wayne Young
*Assistant Examiner* — Dionne Pendleton
(74) *Attorney, Agent, or Firm* — Birch, Stewart, Kolasch & Birch, LLP

(57) ABSTRACT

An optical component, a hologram, and a photodetector are configured in an optical head device of an optical disc device such that a +1-order beam or a −1-order beam of diffracted light generated from light reflected from an information track in the intended information recording layer strikes the interior of the light-receiving surfaces of the tracking error detection light-receiving sections, a +1-order beam or a −1-order beam of diffracted light generated from light reflected from an information track in an information recording layer one layer deeper than the intended information recording layer strikes outside the light-receiving sections, and a +1-order beam or a −1-order beam of diffracted light that is generated from light reflected from an information track in an information recording layer one layer shallower than the intended information recording layer strikes outside the light-receiving sections.

6 Claims, 20 Drawing Sheets

(56) References Cited

U.S. PATENT DOCUMENTS

| | | | |
|---|---|---|---|
| 2009/0278029 A1* | 11/2009 | Ogasawara et al. | 250/201.5 |
| 2010/0271926 A1 | 10/2010 | Nagatomi | |
| 2013/0003516 A1* | 1/2013 | Ogata et al. | 369/112.03 |

FOREIGN PATENT DOCUMENTS

| | | |
|---|---|---|
| JP | 2008-171470 A | 7/2008 |
| JP | 2008-171471 A | 7/2008 |
| JP | 2009-003986 A | 1/2009 |
| JP | 2009-009630 A | 1/2009 |
| JP | 2009-015954 A | 1/2009 |
| JP | 2010-257549 A | 11/2010 |
| WO | WO 2010/018653 A1 | 2/2010 |
| WO | WO 2011/086951 A1 | 7/2011 |

* cited by examiner

NO OBJECTIVE LENS SHIFT

OBJECTIVE LENS SHIFTED TOWARD INNER PERIMETER

OBJECTIVE LENS SHIFTED TOWARD OUTER PERIMETER

FIG. 9
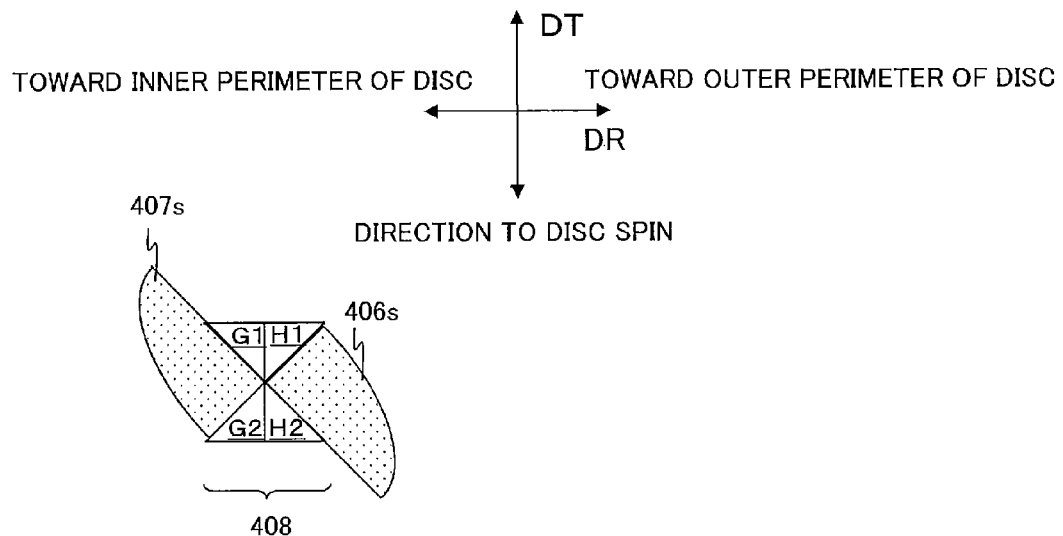
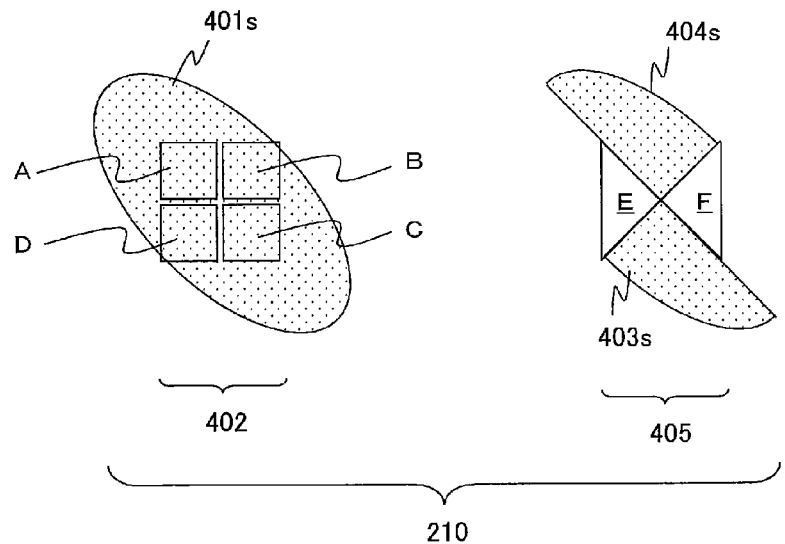

OPTICAL HEAD DEVICE AND OPTICAL DISC DEVICE

TECHNICAL FIELD

The present invention relates to an optical head device and an optical disc device.

BACKGROUND ART

One method of causing laser light from an optical head device to follow an information track is the one-beam push-pull method. In this method, reflected light resulting from diffraction of the laser light by the information track is detected by a light receiving surface divided into two sections, and the objective lens is shifted in the radial direction of the optical disc to make a tracking error signal equal to the difference between the two detected signals approach zero. In this method, however, when the objective lens is shifted in the radial direction of the optical disc, the relative positions of the objective lens and the photodetector are offset, causing an offset in the tracking error signal.

A technique for canceling this offset is proposed in, for example, patent reference 1. In the technique described in patent reference 1, the ±1-orders of diffracted light from a polarizing hologram are separated, each of the separated ±1-orders of diffracted light is detected by a photodetector having a light receiving surface larger than the amount of offset of the illumination position, and the occurrence of offset is avoided by using the signals detected by these light receiving surfaces.

PRIOR ART REFERENCES

Patent Reference

Japanese Patent Application Publication No. 8-63778 (paragraph 17, FIG. 1)

SUMMARY OF THE INVENTION

Problems to be Solved by the Invention

There is a problem in the optical disc device described in patent reference 1, however: when information is recorded on or reproduced from a multilayer optical disc having a plurality of information recording layers in which information tracks are formed, light beams reflected from information recording layers other than the information recording layer to be recorded on or reproduced from illuminate the photodetector and are detected as noise in the tracking error signal.

The present invention addresses this problem in the prior art with the object of providing an optical head device and an optical disc device that can reduce the influence of light beams reflected from information recording layers other than the information recording layer to be recorded on or reproduced from when information is recorded on or reproduced from a multilayer optical disc.

Means for Solving the Problem

An optical head device according to one aspect of the invention includes a laser light source for emitting laser light, an objective lens for focusing the laser light onto an information track in an information recording layer of an optical disc and focusing reflected light diffracted by the information track, a diffractive element for generating diffracted light from the reflected light focused by the objective lens, an optical element for producing astigmatism in the reflected light, and a photodetector for receiving the reflected light. The diffractive element includes a plurality of diffraction regions separated by a first line intersecting, at a +45-degree angle, a line extending in a radial direction of the optical disc and a second line intersecting, at a −45-degree angle, the line extending in the radial direction of the optical disc. The photodetector includes a plurality of light receiving sections for detecting tracking error, the light receiving sections being bounded by a third line intersecting, at a +45-degree angle, a line extending in a direction corresponding to the radial direction and a fourth line intersecting, at a −45-degree angle, the line extending in the direction corresponding to the radial direction. The optical element, the diffractive element, and the photodetector are configured in such a way that +1-order light or −1-order light in the diffracted light generated by the diffractive element from reflected light from an information track in an information recording layer where information is to be recorded or reproduced strikes inside the light receiving surface for detecting the tracking error signal, +1-order light or −1-order light in the diffracted light generated by the diffractive element from reflected light from an information track in an information recording layer one layer deeper than the information recording layer where information is to be recorded or reproduced strikes outside the light receiving surface for detecting the tracking error signal, and +1-order light or −1-order light in the diffracted light generated by the diffractive element from reflected light from an information track in an information recording layer one layer shallower than the information recording layer where information is to be recorded or reproduced strikes outside the light receiving surface for detecting the tracking error signal.

An optical head device according to another aspect of the invention includes a laser light source for emitting laser light, an objective lens for focusing the laser light onto an information track in an information recording layer of an optical disc and focusing reflected light diffracted by the information track, a diffractive element for generating diffracted light from the reflected light focused by the objective lens, an optical element for producing astigmatism in the reflected light, and a photodetector for receiving the reflected light. The diffractive element includes a plurality of diffraction regions separated by a first line intersecting, at a +45-degree angle, a line extending in a radial direction of the optical disc and a second line intersecting, at a −45-degree angle, the line extending in the radial direction of the optical disc. The photodetector has first to eighth light receiving surfaces bounded by a third line intersecting, at a +45-degree angle, a line extending in a direction corresponding to the radial direction, a fourth line intersecting, at a −45-degree angle, the line extending in the direction corresponding to the radial direction, a fifth line extending in the direction corresponding to the radial direction, and a sixth line extending in the direction corresponding to the tangential direction, and ninth to sixteenth light receiving surfaces bounded by a seventh line intersecting, at a +45-degree angle, a line extending in a direction corresponding to the radial direction, an eighth line intersecting, at a −45-degree angle, the line extending in the direction corresponding to the radial direction, a ninth line extending in the direction corresponding to the radial direction, and a tenth line extending in the direction corresponding to the tangential direction. The first to sixteenth light receiving surfaces constitute a light receiving surface for detecting focus error, and a plurality of light receiving surfaces among the first to sixteenth light receiving surfaces constitute the light receiving surface for detecting the tracking error. The optical element, the diffractive element, and the photodetector are configured in such a way that +1-order light or −1-order light in the diffracted light generated by the diffractive element from reflected light from an information track in an information recording layer where information is to be recorded or reproduced strikes inside the light receiving surface for detecting the tracking error signal, +1-order light or −1-order light in the diffracted light generated by the diffractive element from reflected light from an information track in an information recording layer one layer deeper than the information recording layer where information is to be recorded or reproduced strikes outside the light receiving surface for detecting the tracking error signal, and +1-order light or −1-order light in the diffracted light generated by the diffractive element from reflected light from an information track in an information recording layer one layer shallower than the information recording layer where information is to be recorded or reproduced strikes outside the light receiving surface for detecting the tracking error signal.

An optical disc device according to one aspect of the invention includes a disc drive unit for spinning an optical disc, and an optical head device for reading information from the spinning optical disc or writing information on the spinning optical disc. The optical head device includes a laser light source for emitting laser light, an objective lens for focusing the laser light onto an information track in an information recording layer of an optical disc and focusing reflected light diffracted by the information track, a diffractive element for generating diffracted light from the reflected light focused by the objective lens, an optical element for producing astigmatism in the reflected light, and a photodetector for receiving the reflected light. The diffractive element includes a plurality of diffraction regions separated by a first line intersecting, at a +45-degree angle, a line extending in a radial direction of the optical disc and a second line intersecting, at a −45-degree angle, the line extending in the radial direction of the optical disc. The photodetector includes a plurality of light receiving sections for detecting tracking error, the light receiving sections being bounded by a third line intersecting, at a +45-degree angle, a line extending in a direction corresponding to the radial direction and a fourth line intersecting, at a −45-degree angle, the line extending in the direction corresponding to the radial direction. The optical element, the diffractive element, and the photodetector are configured in such a way that +1-order light or −1-order light in the diffracted light generated by the diffractive element from reflected light from an information track in an information recording layer where information is to be recorded or reproduced strikes inside the light receiving surface for detecting the tracking error signal, +1-order light or −1-order light in the diffracted light generated by the diffractive element from reflected light from an information track in an information recording layer one layer deeper than the information recording layer where information is to be recorded or reproduced strikes outside the light receiving surface for detecting the tracking error signal, and +1-order light or −1-order light in the diffracted light generated by the diffractive element from reflected light from an information track in an information recording layer one layer shallower than the information recording layer where information is to be recorded or reproduced strikes outside the light receiving surface for detecting the tracking error signal.

Effect of the Invention

An effect obtained from the invention is that it can reduce the influence of light beams reflected from information recording layers other than the information recording layer to be recorded on or reproduced from when information is recorded on or reproduced from a multilayer optical disc.

BRIEF DESCRIPTION OF THE DRAWINGS

FIG. 9 schematically shows regions illuminated by the light beam reflected from the information recording layer one layer shallower (in a shallower position) than the information recording layer to be recorded on or reproduced from when information is recorded on or reproduced from a multilayer optical disc.

MODE FOR CARRYING OUT THE INVENTION

First Embodiment

Figure 1:
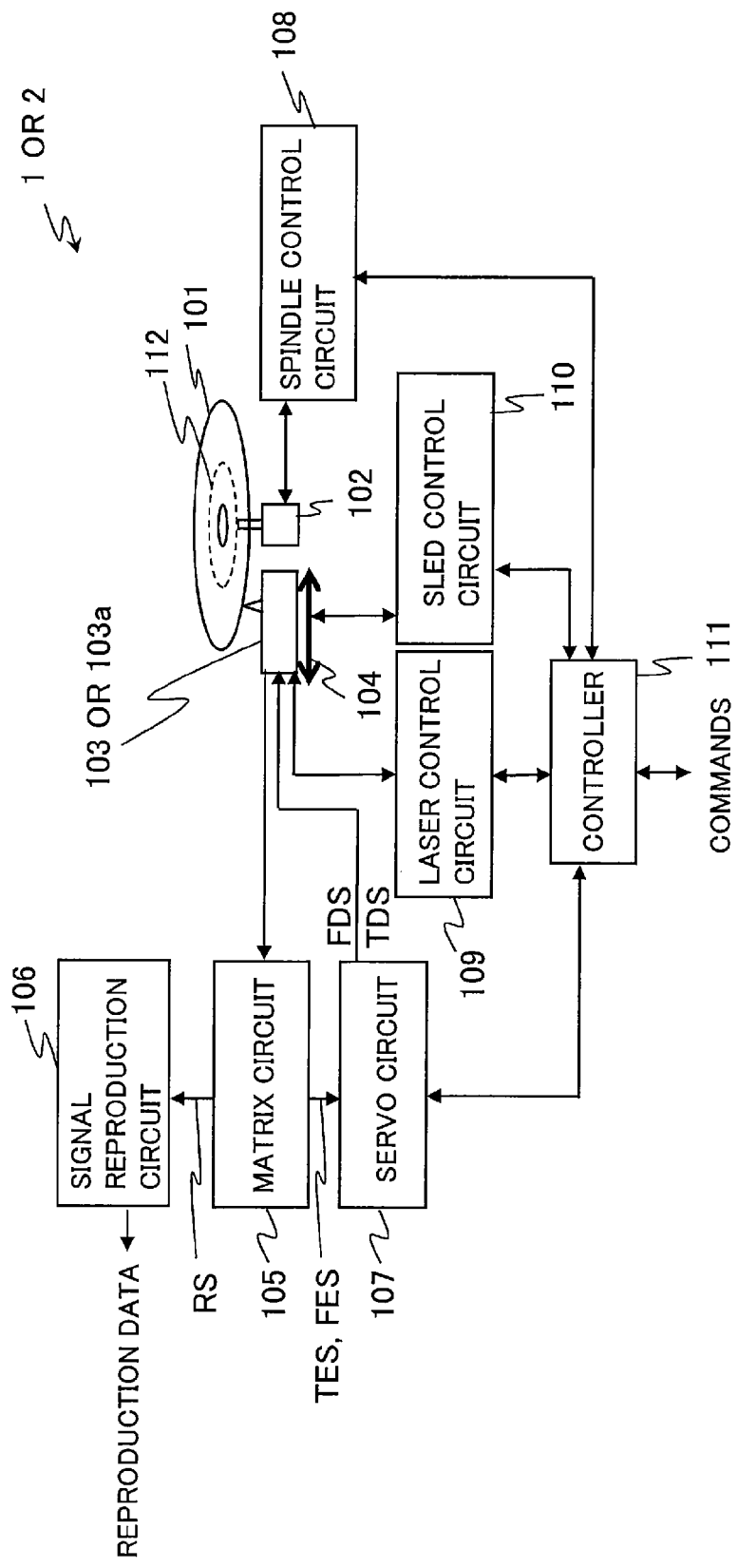
FIG. 1 schematically shows the structure of an optical disc device according to first and second embodiments of the invention.

FIG. 1 schematically shows the structure of an optical disc device 1 according to a first embodiment of the invention. As shown in FIG. 1, the optical disc device 1 (optical disc device 2 in a second embodiment) includes a turntable 112 on which an optical disc 101 is placed, a spindle motor 102 used as a disk drive unit for spinning the turntable in recording or reproducing, an optical head device 103 (optical head device 103a in the second embodiment) for reading data from or writing data on the optical disc 101, and a motor 104 for shifting the optical head device 103 in a radial direction Dr of the optical disk. The optical disc device 1 also includes a matrix circuit 105 to which electrical signals having values corresponding to the amount of received light in the light beam detected by each light receiving surface (light receiving element) of a photodetector (shown in FIG. 2, described later) of the optical head device 103 are supplied, a signal reproduction circuit 106, a servo circuit 107, a spindle control circuit 108, a laser control circuit 109, a sled control circuit 110, and a controller 111.

The matrix circuit 105 includes a matrix operation circuit, an amplifier circuit, and so on, and generates necessary signals such as a reproduction signal RS, which is a high-frequency signal, and a focus error signal FES and a tracking error signal TES for servo control, by matrixing the signals output from the plurality of light receiving surfaces of the photodetector in the optical head device 103. The reproduction signal RS output from the matrix circuit 105 is supplied to the signal reproduction circuit 106, and the focus error signal FES and tracking error signal TES output from the matrix circuit 105 are supplied to the servo circuit 107.

The signal reproduction circuit 106 performs binarization, reproduction clock generation, and other processing on the reproduction signal RS from the matrix circuit 105 and generates reproduction data. The data decoded as far as the reproduction data stage are transferred to a device used as an AV (audio/visual) system or to host equipment such as a personal computer (PC).

The servo circuit 107 generates focus or tracking servo drive signals from the focus error signal FES and tracking error signal TES supplied from the matrix circuit 105 and has the optical head device 103 perform servo operations. Specifically, the servo circuit 107 generates a focus drive signal FDS and a tracking drive signal TDS in accordance with the focus error signal FES and tracking error signal TES, to drive a focus coil and a tracking coil in an objective lens actuator in the optical head device 103. Accordingly, the optical head device 103, matrix circuit 105, and servo circuit 107 form a focus servo loop and a tracking servo loop.

The spindle control circuit 108 controls the rotation of the spindle motor 102. The laser control circuit 109 controls the intensity of laser light emitted from the optical head device 103. The sled control circuit 110 has the motor 104 shift the optical head device 103 in the radial direction Dr of the optical disc 101 and allows the optical head device 103 to read data in a desired position in the radial direction Dr of the optical disc 101 (or allows the optical head device 103 to write data in a desired position in the radial direction Dr of the optical disc 101).

The servo and reproduction operations described above are controlled by the controller 111, which is formed by a microcomputer. The controller 111 executes processing in response to commands from the host equipment.

Figure 2:
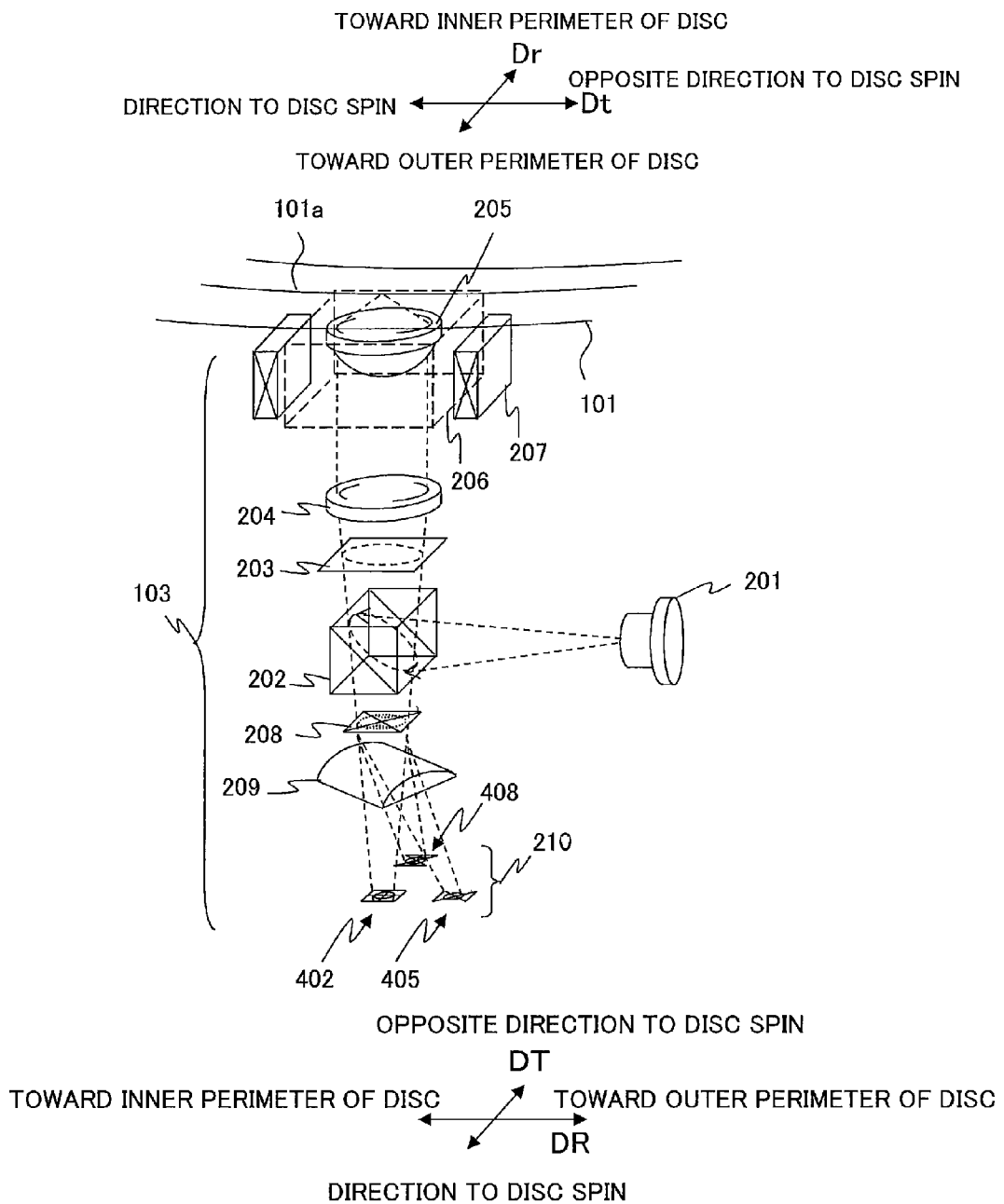
FIG. 2 is a perspective view schematically showing the structure of an optical head device according to the first embodiment.

FIG. 2 is a perspective view schematically showing the structure of the optical head device 103 according to the first embodiment. The optical head device 103 utilizes the one-beam push-pull method and includes a semiconductor laser 201, which is a laser light source for emitting laser light, a polarizing beam splitter 202, a ¼-waveplate 203, a collimator lens 204, an objective lens 205 for focusing the laser light onto the optical disc 101 and focusing reflected light diffracted by an information track 101a in an information recording layer of the optical disc 101, a movable holder 206 for holding the objective lens 205, an objective lens actuator 207 for driving the movable holder 206 in the focus direction or the radial direction Dr of the optical disc 101, a hologram 208 used as a deflection element (diffractive element), a cylindrical lens 209, which is an optical element for producing astigmatism, and a photodetector 210. Laser light emitted from the semiconductor laser 201 is redirected by the polarizing beam splitter 202, passes through the ¼-waveplate 203 and collimator lens 204, and is focused by the objective lens 205 onto the information track 101a in the information recording layer of the optical disc 101. The laser light becomes reflected light diffracted by the information track 101a of the optical disc 101, passes through the objective lens 205, collimator lens 204, ¼-waveplate 203, and polarizing beam splitter 202, is divided into five optical beams by the hologram 208, acquires astigmatism produced by the cylindrical lens 209, and strikes the photodetector 210.

Figure 3A:
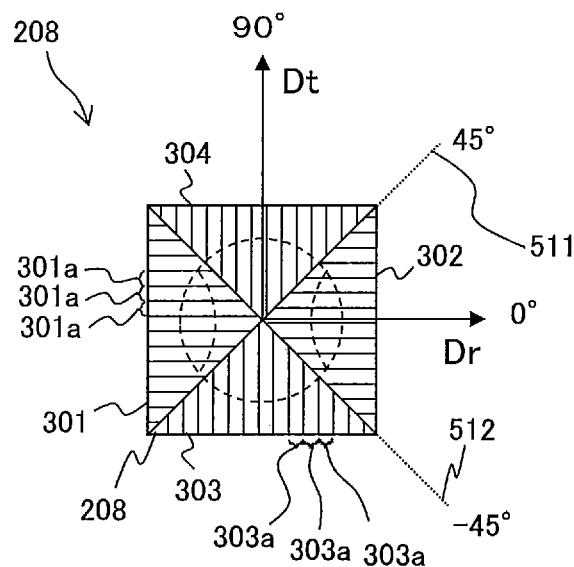
FIGS. 3(a) and 3(b) are plan views schematically showing the hologram in FIG. 2.
Figure 3B:
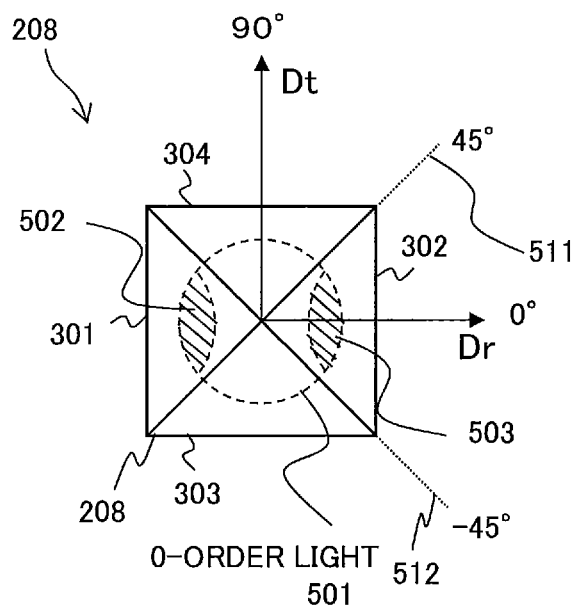

FIGS. 3(a) and 3(b) are plan views showing the hologram 208 in FIG. 2. FIG. 3(a) mainly shows the shape of the hologram 208, and FIG. 3(b) mainly shows regions illuminated by the light beams. As shown in FIG. 3(a), the hologram 208 has four divided deflection regions (diffraction regions): a first diffraction region 301, a second diffraction region 302, a third diffraction region 303, and a fourth diffraction region 304. In the example shown in FIGS. 3(a) and 3(b), the first to fourth diffraction regions 301, 302, 303, 304 all have the same area and an isosceles triangular shape with a right vertex angle. The first to fourth diffraction regions 301, 302, 303, 304 may, however, have a different shape.

As shown in FIG. 3(a), the first diffraction region 301 has a plurality of linear grating patterns 301a extending in the radial direction Dr and arrayed in the tangential direction Dt.

The second diffraction region 302 likewise has a plurality of linear grating patterns extending in the radial direction Dr and arrayed in the tangential direction Dt.

As also shown in FIG. 3(a), the third diffraction region 303 has a plurality of linear grating patterns 303a extending in the tangential direction Dt and arrayed in the radial direction Dr. The fourth diffraction region 304 likewise has a plurality of linear grating patterns extending in the tangential direction Dt and arrayed in the radial direction Dr.

The first diffraction region 301 includes all of hatched region 502 shown in FIG. 3(b). The first diffraction region 301 is illuminated by the 0-order light beam (main beam) of the reflected light diffracted by the information track 101a in the information recording layer to be recorded on or reproduced from on the optical disc 101 (in the region 501 indicated by the dashed circle in FIG. 3(b)); hatched region 502 is illuminated by both the main beam and the −1-order light beam (sub-beam) of the reflected light.

The second diffraction region 302 includes all of hatched region 503 shown in FIG. 3(b). The second diffraction region 302 is illuminated by the 0-order light beam (main beam) of the reflected light diffracted by the information track 101a in the information recording layer to be recorded on or reproduced from on the optical disc 101 (in the region 501 indicated by the dashed circle in FIG. 3(b)); hatched region 503 is illuminated by both the main beam and the +1-order light beam (sub-beam) of the reflected light.

The third diffraction region 303 and fourth diffraction region 304 do not include the hatched regions 502, 503 shown in FIG. 3(b). The third diffraction region 303 and fourth diffraction region 304 are illuminated by the 0-order light beam (main beam) of the reflected light diffracted by the information track 101a in the information recording layer to be recorded on or reproduced from on the optical disc 101 (in the region 501 indicated by the dashed circle in FIG. 3(b)) but do not include any region (hatched region 502 or 503 shown in FIG. 3(b)) illuminated by both the main beam and the +1-order light beam or −1-order light beam (sub-beam) of the reflected light.

As shown in FIGS. 3(a) and 3(b), in the first embodiment, the radial direction Dr passing through the center of the optical disc 101 is defined as the 0 degree direction, and the tangential direction Dt (tangential direction at the illumination position of the light beam in the information track 101a) orthogonal to the radial direction Dr is defined as the 90-degree direction. The first diffraction region 301, second diffraction region 302, third diffraction region 303, and fourth diffraction region 304 are four regions divided by a line 511 extending in the 45-degree direction and a line 512 extending in the −45-degree direction. The ratio of the amounts of diffracted light separated by the first to fourth diffraction regions 301 to 304 of the hologram 208 is, for example:

(1-order light):(0-order light):(−1-order light)=1:8:1

Figure 4:
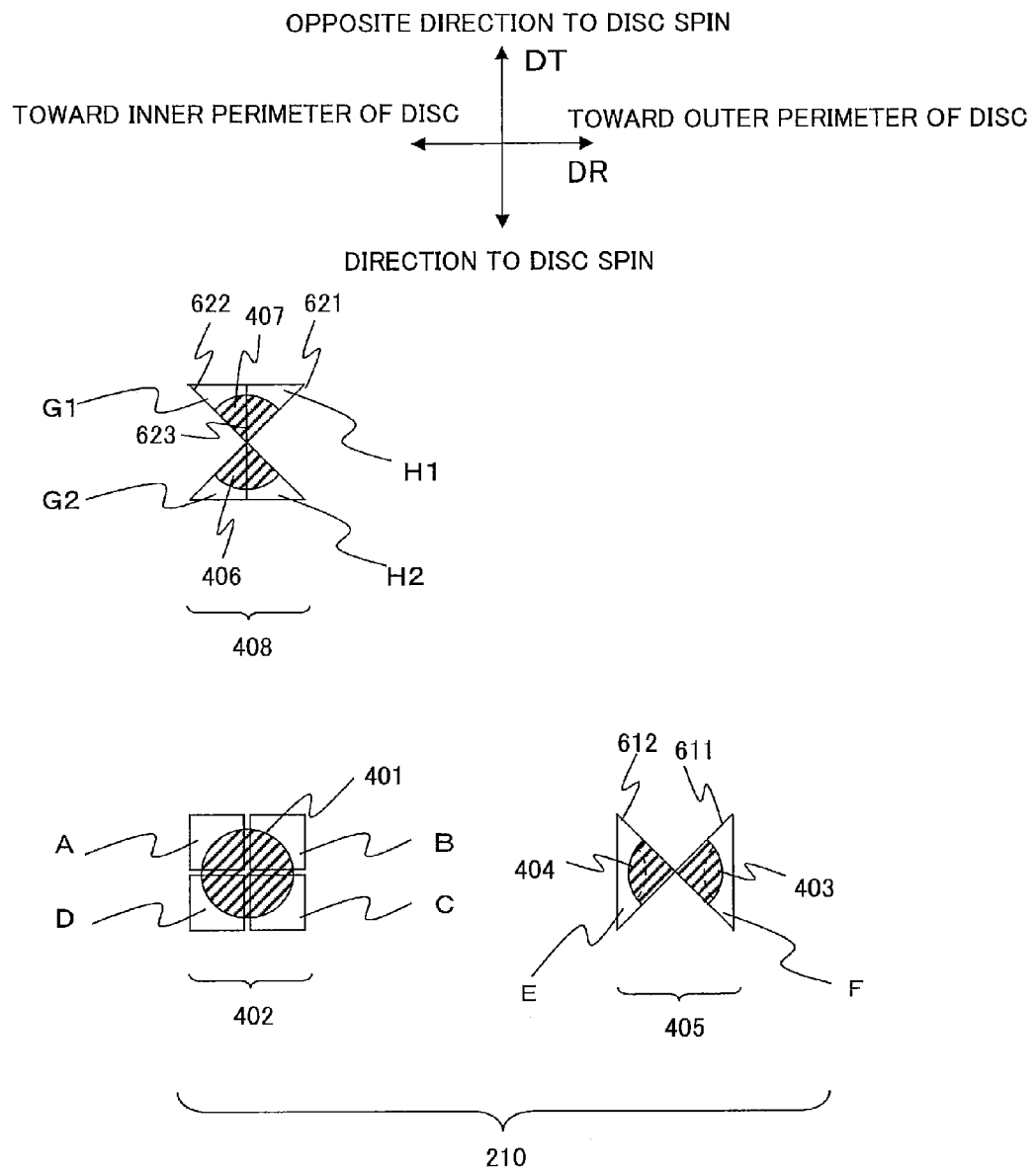
FIG. 4 schematically shows the light receiving surface of the photodetector in FIG. 2 and the regions illuminated by the light beam divided into five parts by the hologram (when the objective lens is not shifted in the radial direction).

FIG. 4 schematically shows the light receiving surface of the semiconductor laser 201 in FIG. 2 and the regions illuminated by the five light beams separated by the hologram 208 (when the objective lens 205 is not shifted in the radial direction).

The photodetector 210 includes a first light receiving section 402 having a plurality of light receiving surfaces A, B, C, D. The first light receiving section 402 receives a first light beam 401 (circular hatched area), which is the 0-order light beam in the diffracted light generated by the first diffraction region 301, second diffraction region 302, third diffraction region 303, and fourth diffraction region 304 of the hologram 208 (or the 0-order light beam in the diffracted light generated by the hologram 208 by diffracting (transmitting) the 0-order light beam (main beam) of the reflected light diffracted by the information track 101a in the information recording layer to be recorded on or reproduced from on the optical disc 101). The first light receiving section 402 is used as a light receiving section for detecting focus error.

The photodetector 210 also includes a second light receiving section 405 having a plurality of light receiving surfaces (a pair of light receiving surfaces E, F having right-angled isosceles triangular shapes with respective facing vertices located in the same position are shown in FIG. 4) adjacently aligned in a direction DR corresponding to the radial direction Dr. The second light receiving section 405 receives a second light beam 403 (fan-shaped hatched area), which is the +1-order light in the diffracted light generated by the first diffraction region 301 of the hologram 208, and a third light beam 404 (fan-shaped hatched area), which is the +1-order light in the diffracted light generated by the second diffraction region 302 of the hologram 208. The diffracted light to be used may instead be the −1-order light in the diffracted light generated by the first diffraction region 301 or second diffraction region 302 of the hologram 208. The shapes of the pair of light receiving surfaces E, F may differ from the exemplary shapes shown. The second light receiving section 405 is used as a first light receiving section for detecting tracking error.

The photodetector 210 further includes a third light receiving section 408 having a plurality of light receiving surfaces (four light receiving surfaces G1, G2, H1, H2 having triangular shapes with respective facing vertices located in the same position are shown in FIG. 4, G1 and H1 forming a pair and G2 and H2 forming another pair) adjacently aligned in a direction DT corresponding to the tangential direction Dt. The third light receiving section 408 receives a fourth light beam 406 (fan-shaped hatched area), which is the +1-order light in the diffracted light generated by the third diffraction region 303 of the hologram 208, and a fifth light beam 407 (fan-shaped hatched area), which is the +1-order light in the diffracted light generated by the fourth diffraction region 304 of the hologram 208. The diffracted light to be used may instead be the −1-order light in the diffracted light generated by the third diffraction region 303 or fourth diffraction region 304 of the hologram 208. The shapes of the light receiving surfaces G1, G2, H1, H2 may differ from the exemplary shapes shown. The third light receiving section 408 is used as a second light receiving section for detecting tracking error.

The photodetector 210 has ten light receiving surfaces, these being the four light receiving surfaces A, B, C, D constituting the first light receiving section 402, the two light receiving surfaces E, F constituting the second light receiving section 405, and the four light receiving surfaces G1, G2, H1, H2 constituting the third light receiving section 408, but the shapes and positions of the light receiving surfaces and the number of light receiving surfaces may differ from the above. The four light receiving surfaces A, B, C, D of the first light receiving section 402 are four rectangular light receiving surfaces of identical shape adjacently aligned (forming two rows and two columns) in a direction DR corresponding to the radial direction Dr of the optical disc 101 and in a direction DT corresponding to the tangential direction Dt.

The two light receiving surfaces E, F of the second light receiving section 405 are two triangular light receiving surfaces aligned in a direction DR corresponding to the radial direction Dr of the optical disc 101. If the direction DR corresponding to the radial direction is the 0-degree direction and the direction DT corresponding to the tangential direction Dt is the 90-degree direction, the two light receiving surfaces of the second light receiving section 405 are bounded by a line 611 extending in the 45-degree direction and a line 612 extending in the −45-degree direction.

The four light receiving surfaces G1, G2, H1, H2 of the third light receiving section 408 are four triangular light receiving surfaces aligned in the direction DR corresponding to the radial direction Dr of the optical disc 101 and the direction DT corresponding to the tangential direction Dt. The four light receiving surfaces G1, G2, H1, H2 of the third light receiving section 408 are bounded by a line 621 extending in the 45-degree direction, a line 622 extending in the −45-degree direction, and a line 623 extending in the direction DT corresponding to the tangential direction Dt.

The first light beam 401, which is the 0-order laser light generated by (passing through) the hologram 208 reaches the light receiving surfaces A, B, C, D of the first light receiving section 402.

The second light beam 403, which is the +1-order light in the diffracted light generated by the first diffraction region 301 of the hologram 208, reaches light receiving surface F of the second light receiving section 405, and the third light beam 404, which is the +1-order light in the diffracted light generated by the second diffraction region 302 of the hologram 208, reaches light receiving surface E of the second light receiving section 405.

The fourth light beam 406, which is the +1-order light in the diffracted light generated by the third diffraction region 303 of the hologram 208, reaches light receiving surfaces G2 and H2 of the third light receiving section 408, and the fifth light beam 407, which is the +1-order light in the diffracted light generated by the fourth diffraction region 304 of the hologram 208, reaches light receiving surfaces G1 and H1 of the third light receiving section 408. In the description given below, the electrical signals photoelectrically converted by the light receiving surfaces A, B, C, D, E, F, G1, G2, H1, H2 or their signal levels will be denoted a0, b0, c0, d0, e0, f0, g1, g2, h1, h2.

The matrix circuit 105 receives the signals a0, b0, c0, d0, e0, f0, g1, g2, h1, h2 detected by the photodetector 210 and generates a focus error signal FES by the astigmatism calculation given below.

$$FES=(a0+c0)-(b0+d0)$$

The matrix circuit 105 further generates a tracking error signal TES by the calculation given below.

$$TES=(e0-f0)-k\times\{(g1+g2)-(h1+h2)\}$$

where k is a constant.

Figure 5:
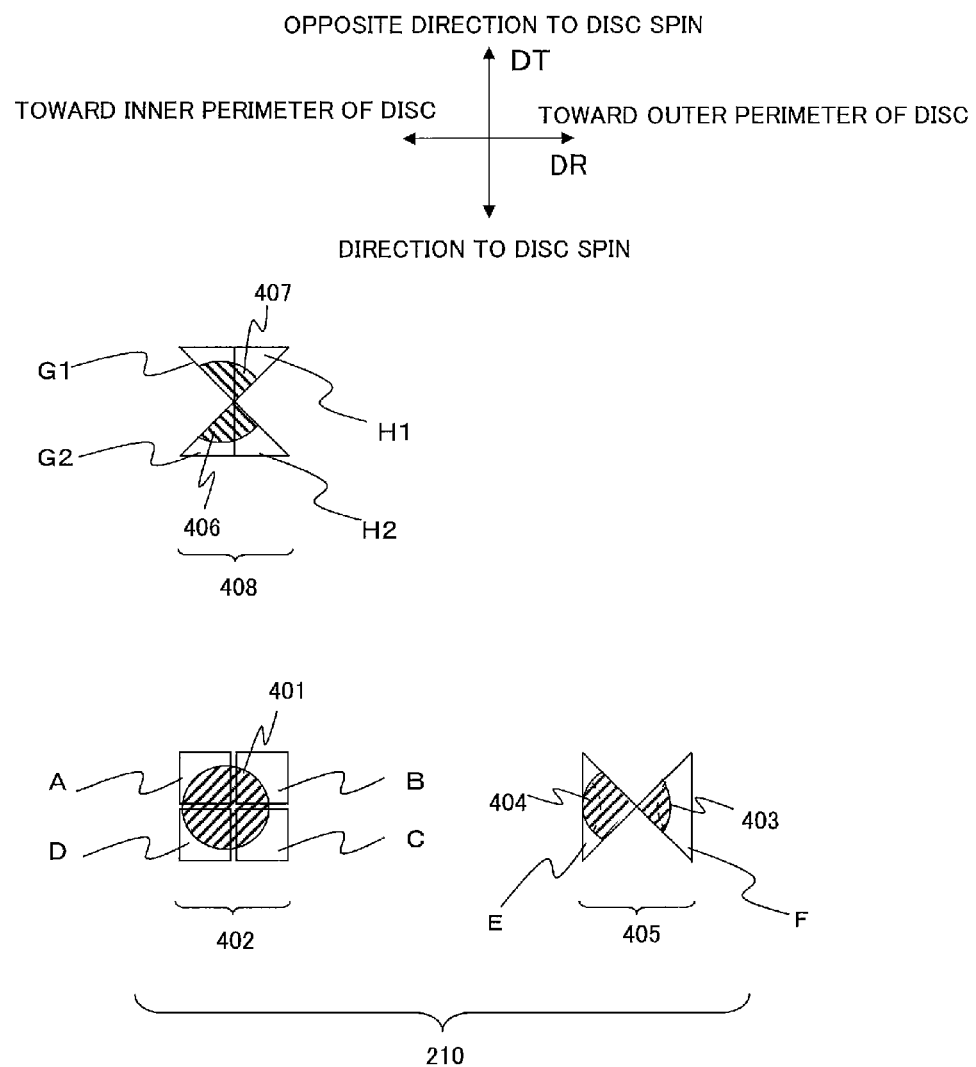
FIG. 5 schematically shows the light receiving surface of the photodetector in FIG. 2 and the regions illuminated by the light beam divided into five parts by the hologram (when the objective lens is shifted in the radial direction toward the inner perimeter of the optical disc).
Figure 6:
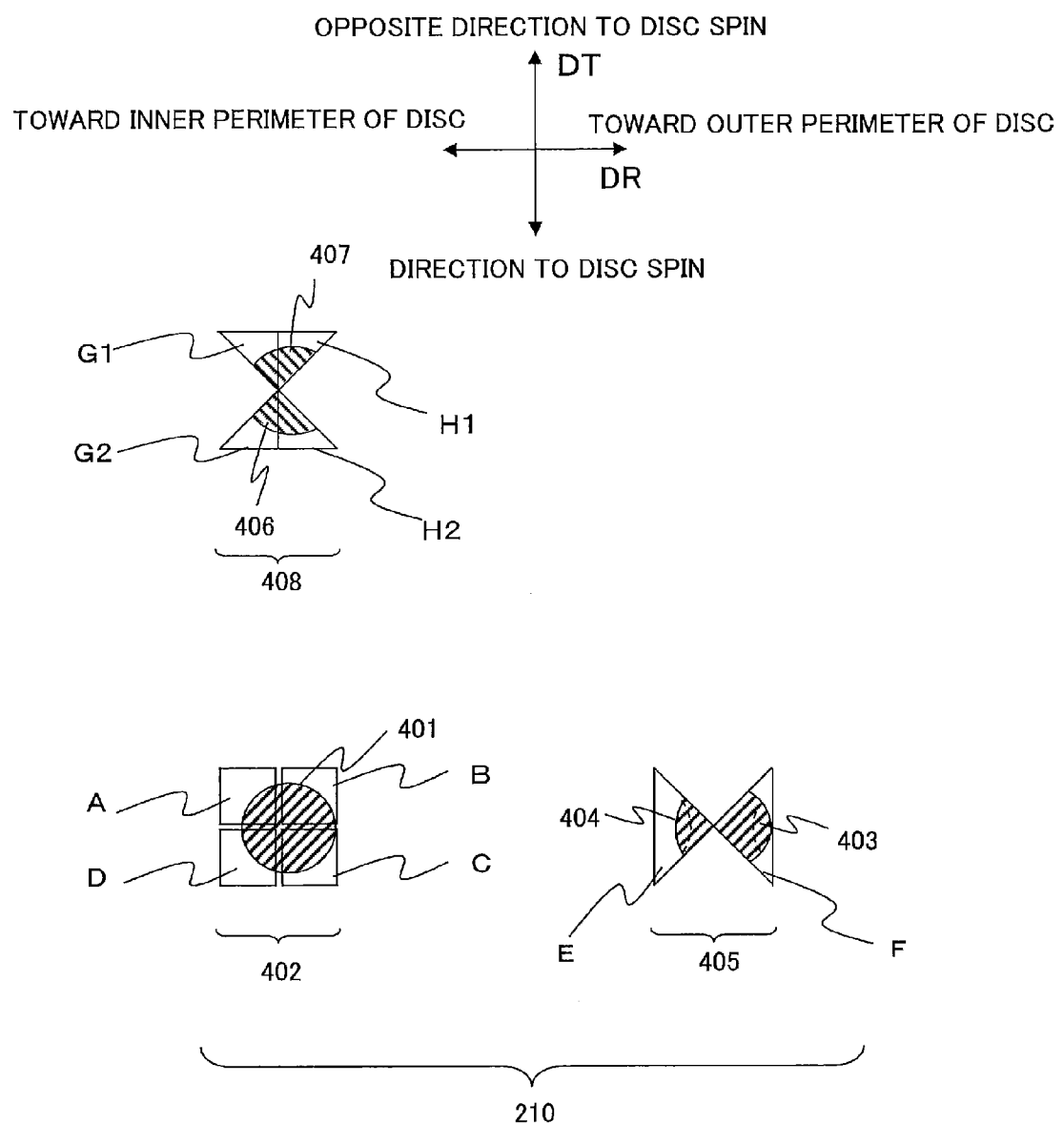
FIG. 6 schematically shows the light receiving surface of the photodetector in FIG. 2 and the regions illuminated by the light beam divided into five parts by the hologram (when the objective lens is shifted in the radial direction toward the outer perimeter of the optical disc).

FIG. 5 schematically shows the light receiving surfaces of the photodetector 210 in FIG. 2 and the regions illuminated by the five light beams 401, 403, 404, 406, 407 separated by the hologram 208 (when the objective lens 205 is shifted in the radial direction Dr toward the inner perimeter of the optical disc). FIG. 6 schematically shows the light receiving surface of the photodetector 210 in FIG. 2 and the regions illuminated by the five light beams 401, 403, 404, 406, 407 separated by the 208 (when the objective lens 205 is shifted in the radial direction Dr toward the outer perimeter of the optical disc). FIG. 5 shows that the first to fifth light beams 401, 403, 404, 406, 407 are shifted to the left in FIG. 5 (in the direction DR corresponding to the radial direction Dr) when the objective lens 205 is shifted toward the inner perimeter of the optical disc 101. FIG. 6 shows that the first to fifth light beams 401, 403, 404, 406, 407 are shifted to the right in FIG. 6 (in the direction DR corresponding to the radial direction Dr or in the direction opposite to the direction in FIG. 5) when the objective lens 205 is shifted toward the outer perimeter of the optical disc 101.

Figure 7A:
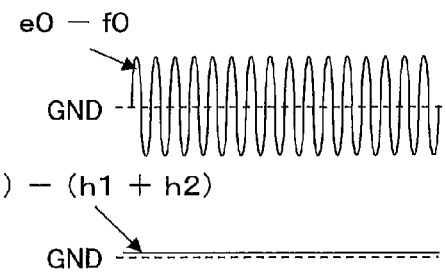
FIGS. 7(a), 7(b), and 7(c) show signals detected by the photodetector in FIG. 2 when the objective lens is not shifted in the radial direction, when the objective lens is shifted toward the inner perimeter of the optical disc, and when the objective lens is shifted toward the outer perimeter of the optical disc.
Figure 7B:
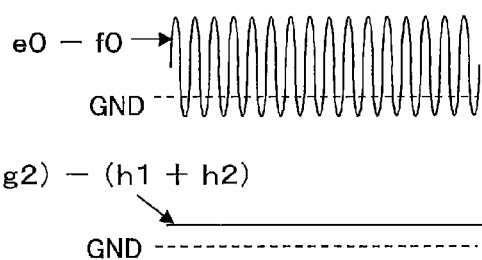
Figure 7C:
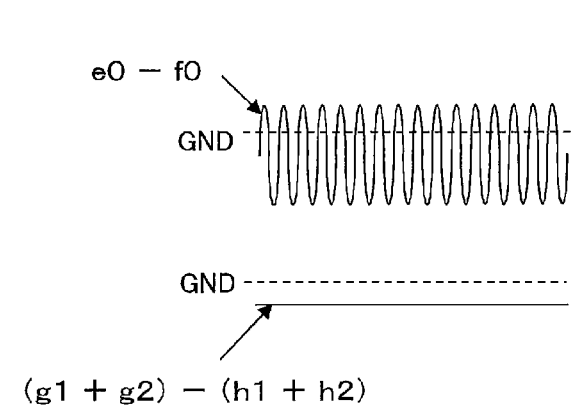

FIGS. 7(a), 7(b), and 7(c) show signals detected by the photodetector 210 in FIG. 2 when the objective lens 205 is not shifted in the radial direction Dr, when the objective lens 205 is shifted toward the inner perimeter of the optical disc, and when the objective lens 205 is shifted toward the outer perimeter of the optical disc. FIGS. 7(a), 7(b), and 7(c) show signals produced when the focus servo is on and the tracking servo is off.

As indicated by FIG. 7(a) and FIG. 4, when the objective lens 205 is not shifted in the radial direction Dr, the signal (e0−f0) has a push-pull waveform with no offset from GND (dotted line). At the same time, the signal ((g1+g2)−(h1+h2)) has a direct-current waveform (solid line) with no offset from GND (dotted line).

As indicated by FIG. 7(b) and FIG. 5, when the objective lens 205 is shifted toward the inner perimeter (of the optical disc) in the radial direction Dr, the signal (e0−f0) has a push-pull waveform with a positive offset from GND (dotted line). At the same time, the signal ((g1+g2)−(h1+h2)) has a direct-current waveform (solid line) with a positive offset from GND (dotted line). Therefore, the value of the signal ((g1+g2)−(h1+h2)) represents a value corresponding to the amount of shift of the objective lens 205. By subtracting the value of the signal ((g1+g2)−(h1+h2)) multiplied by a constant (k) from the value of the signal (e0−f0), an offset-cancelled tracking error signal TES can be obtained.

As indicated by FIG. 7(c) and FIG. 6, when the objective lens 205 is shifted toward the outer perimeter (of the optical disc) in the radial direction Dr, the signal (e0−f0) has a push-pull waveform with a negative offset from GND (dotted line). At the same time, the signal ((g1+g2)−(h1+h2)) has a direct-current waveform (solid line) with a negative offset from GND (dotted line). Therefore, the value of the signal ((g1+g2)−(h1+h2)) represents a value corresponding to the amount of shift of the objective lens 205. By subtracting the value of the signal ((g1+g2)−(h1+h2)) multiplied by a constant from the value of the signal (e0−f0), an offset-cancelled tracking error signal TES can be obtained.

In place of the value of the signal ((g1+g2)−(h1+h2)) multiplied by a constant, the value of the signal (g1−h1) multiplied by a constant or the value of the signal (g2−h2) multiplied by a constant can be used.

Figure 8:
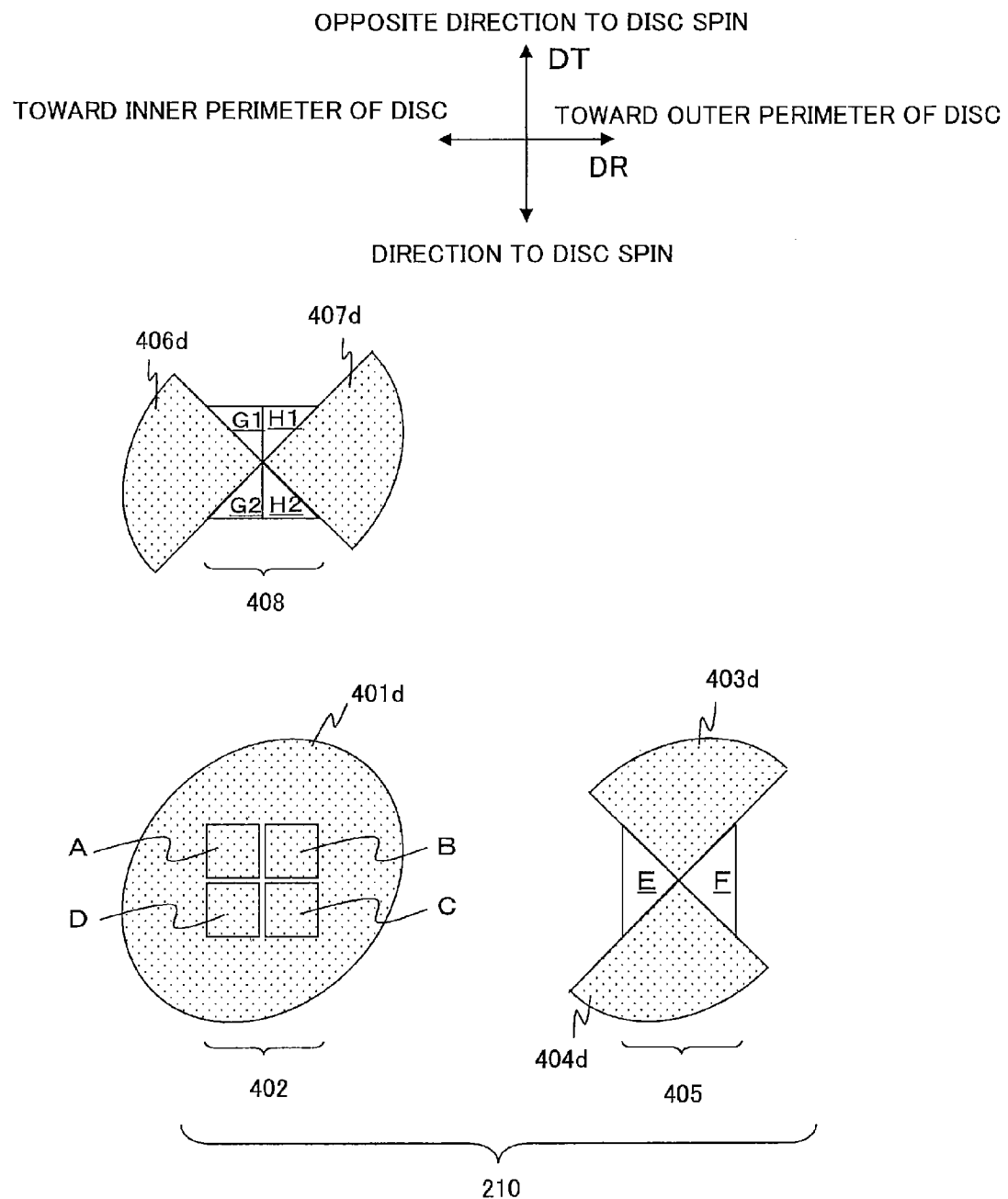
FIG. 8 schematically shows regions illuminated by the light beam reflected from the information recording layer one layer deeper (in a deeper position) than the information recording layer to be recorded on or reproduced from when information is recorded on or reproduced from a multilayer optical disc.

FIG. 8 schematically shows regions in the photodetector 210 illuminated by light beams reflected from the information recording layer one layer deeper (in a deeper position) than the information recording layer to be recorded on or reproduced from when information is recorded on or reproduced from a multilayer optical disc used as the optical disc 101. FIG. 9 schematically shows regions in the photodetector illuminated by light beams reflected from the information recording layer one layer shallower (in a shallower position) than the information recording layer to be recorded on or reproduced from when information is recorded on or reproduced from a multilayer optical disc used as the optical disc 101.

As shown in FIG. 8, the light beam reflected from the information recording layer one layer deeper (in a deeper position) than the information recording layer to be recorded on or reproduced from is divided into five parts by the hologram 208. A first light beam 401d consisting of the 0-order laser light generated by (passing through) the hologram 208 reaches the light receiving surfaces A, B, C, D of the first light receiving section 402 in a blurred state. A second light beam 403d consisting of the +1-order light in the diffracted light generated by the first diffraction region 301 of the hologram 208 and a third light beam 404d consisting of the +1-order light in the diffracted light generated by the second diffraction region 302 of the hologram 208 reach the second light receiving section 405 but are not received there because of the effect of the astigmatism of the cylindrical lens 209. A fourth light beam 406d consisting of the +1-order light in the diffracted light generated by the third diffraction region 303 of the hologram 208 and a fifth light beam 407d consisting of the +1-order light in the diffracted light generated by the fourth diffraction region 304 of the hologram 208 reach the third light receiving section 408 but are not received there because of the effect of the astigmatism of the cylindrical lens 209.

Thus because of the hologram 208, the first light beam 401d reaches the light receiving surfaces A, B, C, D of the first light receiving section 402 in a blurred state and covers all of the light receiving surfaces A, B, C, D of the first light receiving section 402. Therefore, even if the region illuminated by the first light beam 401d is shifted as shown in FIG. 5 or 6, the first light beam 401d reaching the first light receiving section 402 covers substantially all of the light receiving surfaces A, B, C, D and has only a slight effect on the value of the focus error signal given by $$FES=(a0+c0)-(b0+d0).$$

Also because of the hologram 208, the second light beam 403d and third light beam 404d reach the second light receiving section 405 but are not received there. Therefore, even if the regions illuminated by the second light beam 403d and third light beam 404d are shifted as shown in FIG. 5 or 6, the second light beam 403d and third light beam 404d do not fall upon (or fall only slightly upon) the light receiving surfaces E, F of the second light receiving section 405 and have only a slight effect on the value of the tracking error signal given by $$TES=(e0-f0)-k\times\{(g1+g2)-(h1+h2)\}.$$

Also because of the hologram 208, the fourth light beam 406d and fifth light beam 407d reach the third light receiving section 408 but are not received there. Therefore, even if the regions illuminated by the fourth light beam 406d and fifth light beam 407d are shifted as shown in FIG. 5 or 6, the fourth light beam 406d and fifth light beam 407d do not fall upon (or fall only slightly upon) the light receiving surfaces G1, G2, H1, H2 of the third light receiving section 408 and have only a slight effect on the value of the tracking error signal given by $$TES=(e0-f0)-k\times\{(g1+g2)-(h1+h2)\}.$$

As shown in FIG. 9, the light beam reflected from the information recording layer one layer shallower (in a shallower position) than the information recording layer to be recorded on or reproduced from is divided into five parts by the hologram 208. A first light beam 401s consisting of the 0-order laser light generated by (passing through) the hologram 208 reaches the light receiving surfaces A, B, C, D of the first light receiving section 402 with its beam diameter widened. A second light beam 403s consisting of the +1-order light in the diffracted light generated by the first diffraction region 301 of the hologram 208 and a third light beam 404s consisting of the +1-order light in the diffracted light generated by the second diffraction region 302 of the hologram 208 reach the second light receiving section 405 but are not received there because of the effect of the astigmatism of the cylindrical lens 209. A fourth light beam 406s consisting of the +1-order light in the diffracted light generated by the third diffraction region 303 of the hologram 208 and a fifth light beam 407s consisting of the +1-order light in the diffracted light generated by the fourth diffraction region 304 of the hologram 208 reach the third light receiving section 408 but are not received there because of the effect of the astigmatism of the cylindrical lens 209.

Thus because of the hologram 208, the first light beam 401s reaches the light receiving surfaces A, B, C, D of the first light receiving section 402 in a blurred state and covers all of the light receiving surfaces A, B, C, D of the first light receiving section 402. Therefore, even if the region illuminated by the first light beam 401s is shifted as shown in FIG. 5 or 6, the first light beam 401s reaching the first light receiving section 402 covers substantially all of the light receiving surfaces A, B, C, D and has only a slight effect on the value of the focus error signal given by $$FES=(a0+c0)-(b0+d0).$$

Also because of the hologram 208, the second light beam 403s and third light beam 404s reach the second light receiving section 405 but are not received there. Therefore, even if the regions illuminated by the second light beam 403s and third light beam 404s are shifted as shown in FIG. 5 or 6, the second light beam 403s and third light beam 404s do not fall upon (or fall only slightly upon) the light receiving surfaces E, F of the second light receiving section 405 and have only a slight effect on the value of the tracking error signal given by $$TES=(e0-f0)-k\times\{(g1+g2)-(h1+h2)\}.$$

Also because of the hologram 208, the fourth light beam 406s and fifth light beam 407s reach the third light receiving section 408 but are not received there. Therefore, even if the regions illuminated by the fourth light beam 406s and fifth light beam 407s are shifted as shown in FIG. 5 or 6, the fourth light beam 406s and fifth light beam 407s do not fall upon (or fall only slightly upon) the light receiving surfaces G1, G2, H1, H2 of the third light receiving section 408 and have only a slight effect on the value of the tracking error signal given by $$TES=(e0-f0)-k\times\{(g1+g2)-(h1+h2)\}.$$

The second light receiving section 405 and third light receiving section 408 should be disposed at a distance from the first light receiving section 402 such that when the beam diameters of the first light beams 401d, 401s are widened as shown in FIGS. 8 and 9 they will still not be received by the second light receiving section 405 or third light receiving section 408.

The second light receiving section 405 and third light receiving section 408 should also be disposed in such a manner that the second light receiving section 405 will not receive the second light beams 403d, 403s when their beam diameters are widened or the third light beams 404d, 404s when their beam diameters are widened and the third light receiving section 408 will not receive the fourth light beams 406d, 406s when their beam diameters are widened or the fifth light beams 407d, 407s when their beam diameters are widened.

In the first embodiment as described above, the cylindrical lens 209 used as an optical element for producing astigmatism, the hologram 208 used as a diffractive element, and the photodetector 210 are configured in the following manner: the +1-order light or −1-order light in the diffracted light generated by the hologram 208 from the light reflected from an information track in the information recording layer to be recorded on or reproduced from on the optical disc 101 strikes inside the light receiving surfaces of the second light receiving section 405 and third light receiving section 408, which are light receiving sections for detecting tracking error; the +1-order light or −1-order light in the diffracted light generated by the hologram 208 from the light reflected from an information track in an information recording layer one layer deeper than the information recording layer to be recorded on or reproduced from on the optical disc 101 strikes outside (almost entirely outside in FIGS. 8 and 9) the light receiving surfaces of the second light receiving section 405 and third light receiving section 408; the +1-order light or −1-order light in the diffracted light generated by the hologram 208 from the light reflected from an information track in an information recording layer one layer shallower than the information recording layer to be recorded on or reproduced from on the optical disc 101 strikes outside (almost entirely outside in FIGS. 8 and 9) the light receiving surfaces of the second light receiving section 405 and third light receiving section 408. Therefore, the optical head device 103 or optical disc device 1 according to the first embodiment can reduce the effect on the tracking error signal of the light beams reflected from information recording layers other than the information recording layer to be recorded on or reproduced from when information is recorded on or reproduced from a multilayer optical disc having a plurality of information recording layers containing information tracks. In other words, the effect on the tracking error signal of the light beams reflected from information recording layers other than the information recording layer to be recorded on or reproduced from can be reduced by strategies involving the structure and disposition of the cylindrical lens 209, the structure and disposition of the hologram 208, and the positions and shapes of the light receiving surfaces of the plurality of light receiving sections of the photodetector 210.

Second Embodiment

Figure 10:
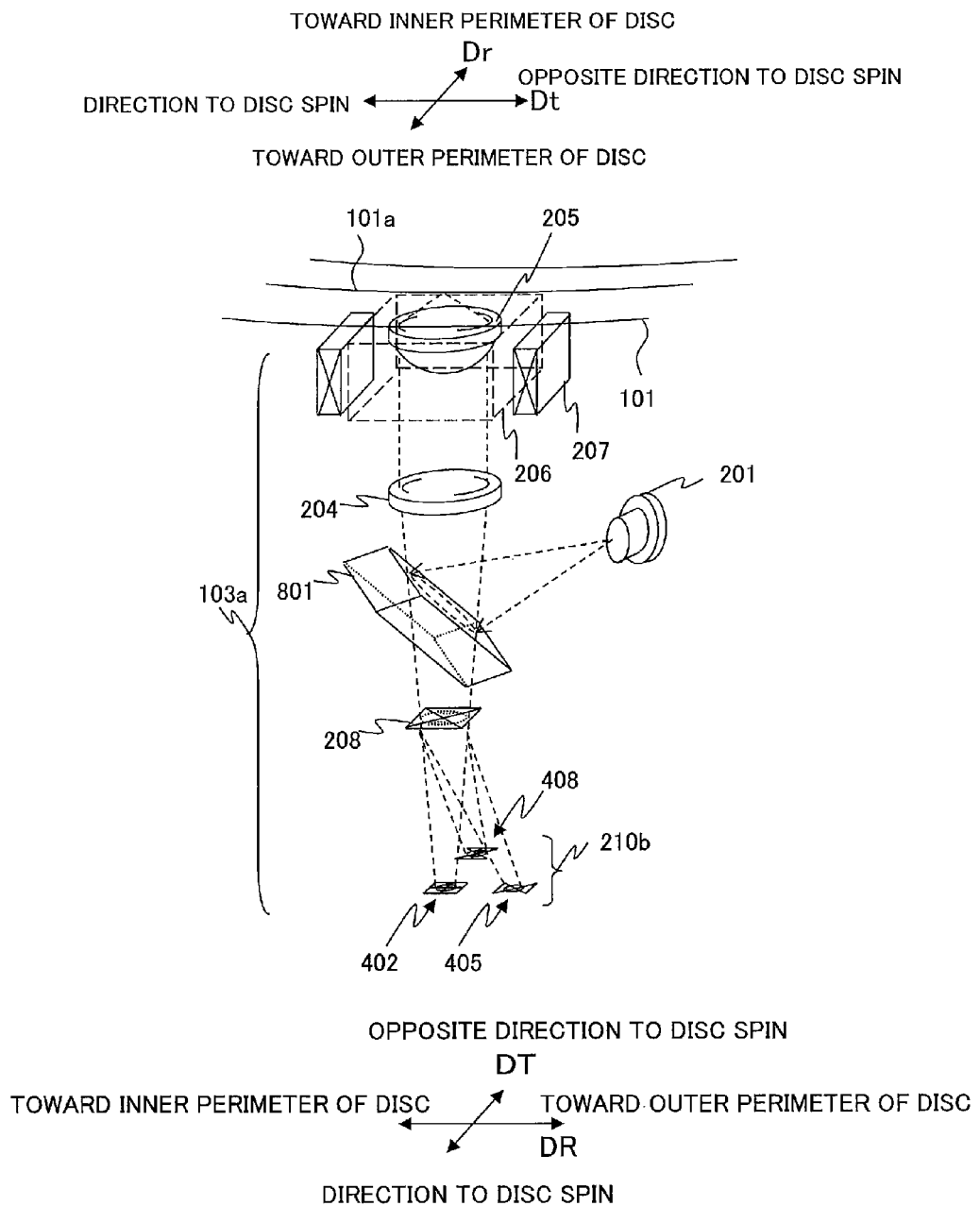
FIG. 10 is a perspective view schematically showing the structure of an optical head device according to the second embodiment.

FIG. 10 is a perspective view schematically showing the structure of an optical head device 103a according to a second embodiment of the invention. In FIG. 10, elements identical to or corresponding to elements shown in FIG. 2 are denoted by like reference characters. As shown in FIG. 10, the optical head device 103a includes a semiconductor laser 201, a collimator lens 204, an objective lens 205, a movable holder 206, an objective lens actuator 207, a hologram 208, and a photodetector 210, as in the first embodiment. The optical head device 103a according to the second embodiment differs from the optical head device 103 according to the first embodiment in that a flat beam splitter 801 is used instead of the polarizing beam splitter 202 and cylindrical lens 209 in the first embodiment. Accordingly, the drawings used in the description of the first embodiment will be referred to again in the description of the second embodiment.

The hologram 208 in the second embodiment is the same as in the first embodiment, as described with reference to FIGS. 3(a) and 3(b).

In the second embodiment, the regions on the light receiving surfaces of the photodetector 210 illuminated by the five light beams separated by the hologram 208 and the method of calculating the focus error signal FES and tracking error signal TES are as described in the first embodiment with reference to FIGS. 4 to 6.

The signals detected by the photodetector 210 in FIG. 10 when the objective lens 205 is not shifted in the radial direction Dr, when the objective lens 205 is shifted toward the inner perimeter of the optical disc, and when the objective lens 205 is shifted toward the outer perimeter of the optical disc are the same as in the first embodiment, as described with reference to FIGS. 7(a), 7(b), and 7(c).

The regions in the photodetector 210 illuminated by light beams reflected from the information recording layer one layer deeper (in a deeper position) than the information recording layer to be recorded on or reproduced from when information is recorded on or reproduced from a multilayer optical disc used as the optical disc 101 are the same as in the first embodiment, as described with reference to FIG. 8. The regions in the photodetector 210 illuminated by light beams reflected from the information recording layer one layer shallower (in a shallower position) than the information recording layer to be recorded on or reproduced from when information is recorded on or reproduced from a multilayer optical disc used as the optical disc 101 are the same as in the first embodiment, as described with reference to FIG. 9.

As shown in FIG. 8, the light beam reflected from the information recording layer one layer deeper than the information recording layer to be recorded on or reproduced from is divided into five parts by the hologram 208. A first light beam 401d consisting of the 0-order laser light generated by (passing through) the hologram 208 reaches the light receiving surfaces A, B, C, D of the first light receiving section 402 in a blurred state. A second light beam 403d consisting of the +1-order light in the diffracted light generated by the first diffraction region 301 of the hologram 208 and a third light beam 404d consisting of the +1-order light in the diffracted light generated by the second diffraction region 302 of the hologram 208 reach the second light receiving section 405 but are not received there because of the effect of the astigmatism of the flat beam splitter 801. A fourth light beam 406d consisting of the +1-order light in the diffracted light generated by the third diffraction region 303 of the hologram 208 and a fifth light beam 407d consisting of the +1-order light in the diffracted light generated by the fourth diffraction region 304 of the hologram 208 reach the third light receiving section 408 but are not received there because of the effect of the astigmatism of the flat beam splitter 801.

As in the first embodiment, because of the hologram 208, the first light beam 401d reaches the light receiving surfaces A, B, C, D of the first light receiving section 402 in a blurred state and covers all of the light receiving surfaces A, B, C, D of the first light receiving section 402. Therefore, even if the region illuminated by the first light beam 401d is shifted as shown in FIG. 5 or 6, the first light beam 401d reaching the first light receiving section 402 covers substantially all of the light receiving surfaces A, B, C, D and has only a slight effect on the value of the focus error signal given by $FES=(a0+c0)-(b0+d0)$.

Also because of the hologram 208, the second light beam 403d and third light beam 404d reach the second light receiving section 405 but are not received there. Therefore, even if the regions illuminated by the second light beam 403d and third light beam 404d are shifted as shown in FIG. 5 or 6, the second light beam 403d and third light beam 404d do not fall upon (or fall only slightly upon) the light receiving surfaces E, F of the second light receiving section 405 and have only a slight effect on the value of the tracking error signal given by $TES=(e0-f0)-k\times\{(g1+g2)-(h1+h2)\}$.

Also because of the hologram 208, the fourth light beam 406d and fifth light beam 407d reach the third light receiving section 408 but are not received there. Therefore, even if the regions illuminated by the fourth light beam 406d and fifth light beam 407d are shifted as shown in FIG. 5 or 6, the fourth light beam 406d and fifth light beam 407d do not fall upon (or fall only slightly upon) the light receiving surfaces G1, G2, H1, H2 of the third light receiving section 408 and have only a slight effect on the value of the tracking error signal given by $TES=(e0-f0)-k\times\{(g1+g2)-(h1+h2)\}$.

As shown in FIG. 9, the light beam reflected from the information recording layer one layer shallower than the information recording layer to be recorded on or reproduced from is divided into five parts by the hologram 208. A first light beam 401s consisting of the 0-order laser light generated by (passing through) the hologram 208 reaches the light receiving surfaces A, B, C, D of the first light receiving section 402 with its beam diameter widened. A second light beam 403s consisting of the +1-order light in the diffracted light generated by the first diffraction region 301 of the hologram 208 and a third light beam 404s consisting of the +1-order light in the diffracted light generated by the second diffraction region 302 of the hologram 208 reach the second light receiving section 405 but are not received there because of the effect of the astigmatism of the flat beam splitter 801. A fourth light beam 406s consisting of the +1-order light in the diffracted light generated by the third diffraction region 303 of the hologram 208 and a fifth light beam 407s consisting of the +1-order light in the diffracted light generated by the fourth diffraction region 304 of the hologram 208 reach the third light receiving section 408 but are not received there because of the effect of the astigmatism of the flat beam splitter 801.

As in the first embodiment, the first light beam 401s from the hologram 208 that reaches the light receiving surfaces A, B, C, D of the first light receiving section 402 in a blurred state covers all of the light receiving surfaces A, B, C, D of the first light receiving section 402. Therefore, even if the region illuminated by the first light beam 401s is shifted as shown in FIG. 5 or 6, the first light beam 401s reaching the first light receiving section 402 covers substantially all of the light receiving surfaces A, B, C, D and has only a slight effect on the value of the focus error signal given by $$FES=(a0+c0)-(b0+d0).$$

Because of the hologram 208, the second light beam 403s and third light beam 404s reach the second light receiving section 405 but are not received there. Therefore, even if the regions illuminated by the second light beam 403s and third light beam 404s are shifted as shown in FIG. 5 or 6, the second light beam 403s and third light beam 404s do not fall upon (or fall only slightly upon) the light receiving surfaces E, F of the second light receiving section 405 and have only a slight effect on the value of the tracking error signal given by $$TES=(e0-f0)-k\times\{(g1+g2)-(h1+h2)\}.$$

Also because of the hologram 208, the fourth light beam 406s and fifth light beam 407s reach the third light receiving section 408 but are not received there. Therefore, even if the regions illuminated by the fourth light beam 406s and fifth light beam 407s are shifted as shown in FIG. 5 or 6, the fourth light beam 406s and fifth light beam 407s do not fall upon (or fall only slightly upon) the light receiving surfaces G1, G2, H1, H2 of the third light receiving section 408 and have only a slight effect on the value of the tracking error signal given by $$TES=(e0-f0)-k\times\{(g1+g2)-(h1+h2)\}.$$

In the second embodiment, as described above, the cylindrical lens 209 used as an optical element for producing astigmatism, the hologram 208 used as a diffractive element, and the photodetector 210 are configured in the following manner: the +1-order light or −1-order light in the diffracted light generated by the hologram 208 from the light reflected from an information track of the information recording layer to be recorded on or reproduced from on the optical disc 101 strikes inside the light receiving surfaces of the second light receiving section 405 and third light receiving section 408, which are light receiving sections for detecting tracking error; the +1-order light or −1-order light in the diffracted light generated by the hologram 208 from the light reflected from an information track in an information recording layer one layer deeper than the information recording layer to be recorded on or reproduced from on the optical disc 101 strikes outside (almost entirely outside in FIGS. 8 and 9) the light receiving surfaces of the second light receiving section 405 and third light receiving section 408; the +1-order light or −1-order light in the diffracted light generated by the hologram 208 from the light reflected from an information track in an information recording layer one layer shallower than the information recording layer to be recorded on or reproduced from on the optical disc 101 strikes outside (almost entirely outside in FIGS. 8 and 9) the light receiving surfaces of the second light receiving section 405 and third light receiving section 408. Therefore, the optical head device 103a or optical disc device 2 according to the second embodiment can reduce the effect on the tracking error signal of the light beams reflected from information recording layers other than the information recording layer to be recorded on or reproduced from when information is recorded on or reproduced from a multilayer optical disc having a plurality of information recording layers containing information tracks. In other words, the effect on the tracking error signal of the light beams reflected from information recording layers other than the information recording layer to be recorded on or reproduced from can be reduced by strategies involving the structure and disposition of the flat beam splitter 801, the structure and disposition of the hologram 208, and the positions and shapes of the light receiving surfaces of the plurality of light receiving sections of the photodetector 210.

Figure 11:
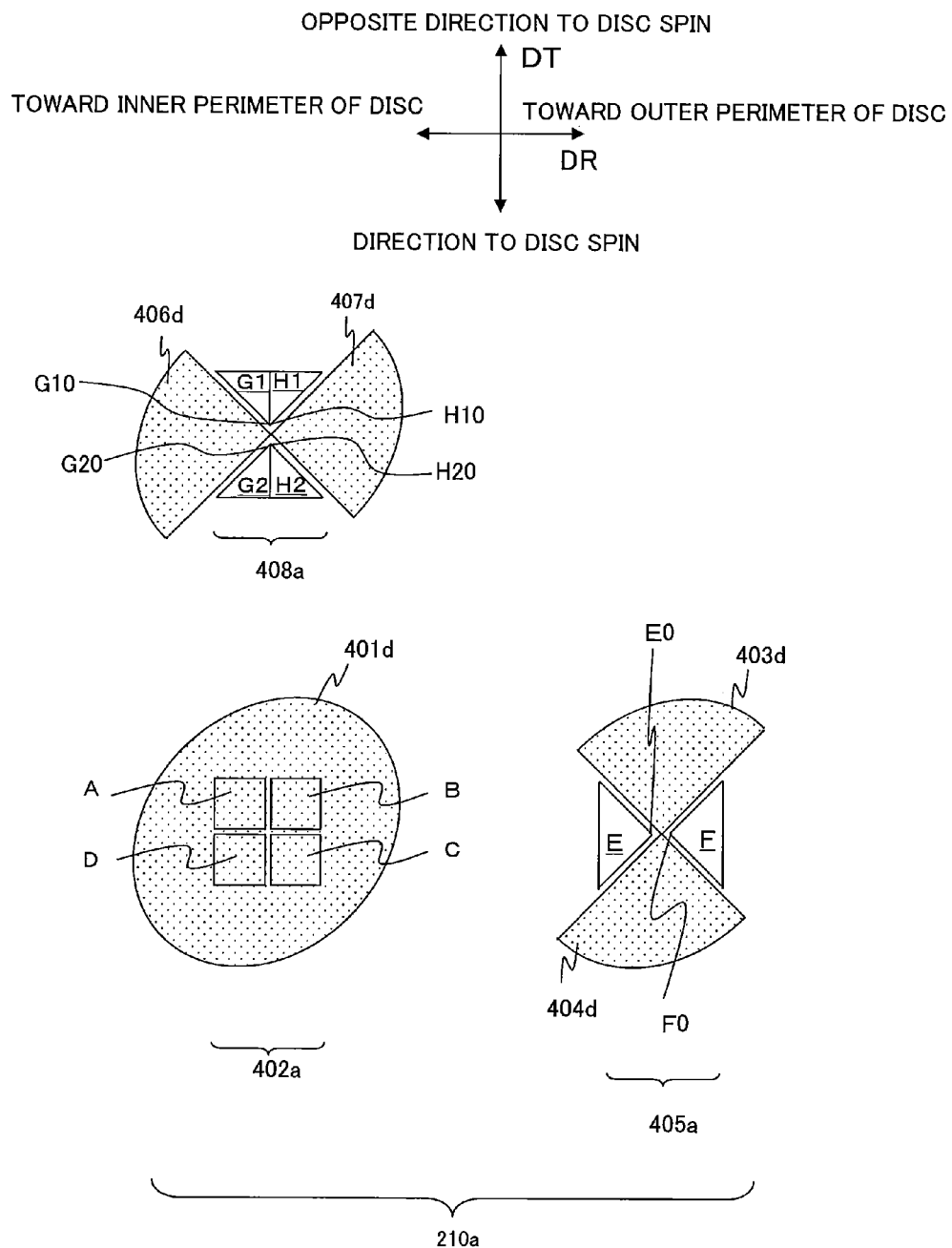
FIG. 11 schematically shows other examples of the light receiving surface of the photodetectors in FIGS. 2 and 10.

FIG. 11 shows other examples of the light receiving surfaces of the photodetectors in FIGS. 2 and 10, together with the regions illuminated by light as in FIG. 8. As shown in FIG. 11, the photodetector 210a includes a first light receiving section 402a, a second light receiving section 405a, and a third light receiving section 408a. The first light receiving section 402a includes four light receiving surfaces A, B, C, D aligned in a direction DR corresponding to the radial direction Dr and a direction DT corresponding to the tangential direction Dt; the second light receiving section 405a includes two light receiving surfaces E, F aligned in the direction DR corresponding to the radial direction Dr; the third light receiving section 408a includes light receiving surfaces G1, G2, forming a pair, and light receiving surfaces H1, H2, forming another pair, aligned in the direction DT corresponding to the tangential direction Dt.

The light receiving surfaces E, F constituting the b405a may be disposed with a distance left between their vertices E0 and F0 as shown in FIG. 11, so that the light beams reflected from information recording layers other than the information recording layer to be recorded on or reproduced from will not be received by the light receiving sections of the photodetector 210a. The light receiving surfaces G1 and G2 and the light receiving surfaces H1 and H2 constituting the first light receiving section 408a likewise may be disposed with a distance left between their vertices G10 and G20 and between their vertices H10 and H20. When the above structure is adopted, even if the regions illuminated by the second light beam 403d and third light beam 404d are shifted as shown in FIG. 5 or 6, the second light beam 403d and third light beam 404d are still less likely to fall upon the light receiving surfaces E, F of the second light receiving section 405 and have an even slighter effect on the value of the tracking error signal TES. Moreover, even if the regions illuminated by the fourth light beam 406d and fifth light beam 407d are shifted as shown in FIG. 5 or 6, the fourth light beam 406d and fifth light beam 407d are still less likely to fall upon the light receiving surfaces G1, G2, H1, H2 of the third light receiving section 408 and have an even slighter effect on the value of the tracking error signal TES.

Third Embodiment

Figure 12:
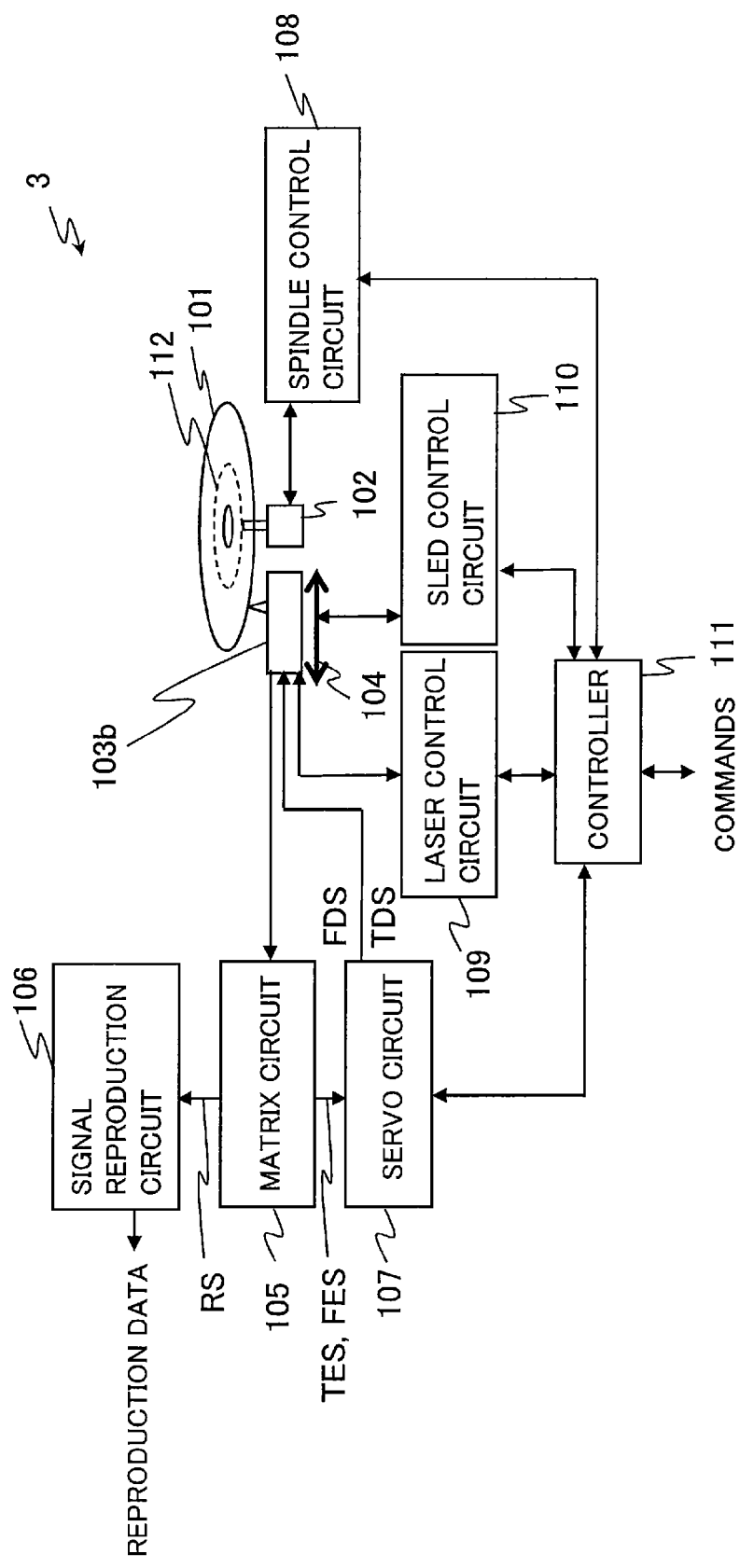
FIG. 12 schematically shows the structure of an optical disc device according to a third embodiment of the invention.

FIG. 12 schematically shows the structure of an optical disc device 3 according to a third embodiment of the invention. In FIG. 12, elements identical to or corresponding to elements of the optical disc device 1 shown in FIG. 1 are denoted by like reference characters. As shown in FIG. 12, the optical head device 103*b* of the optical disc device 3 according to the third embodiment differs from the optical head device 103 of the optical disc device 1 according to the first embodiment or the optical head device 103*a* of the optical disc device 2 according to the first second embodiment. Otherwise, the optical disc device 3 according to the third embodiment is the same as the optical disc device 1 according to the first embodiment or the optical disc device 2 according to the second embodiment.

Figure 13:
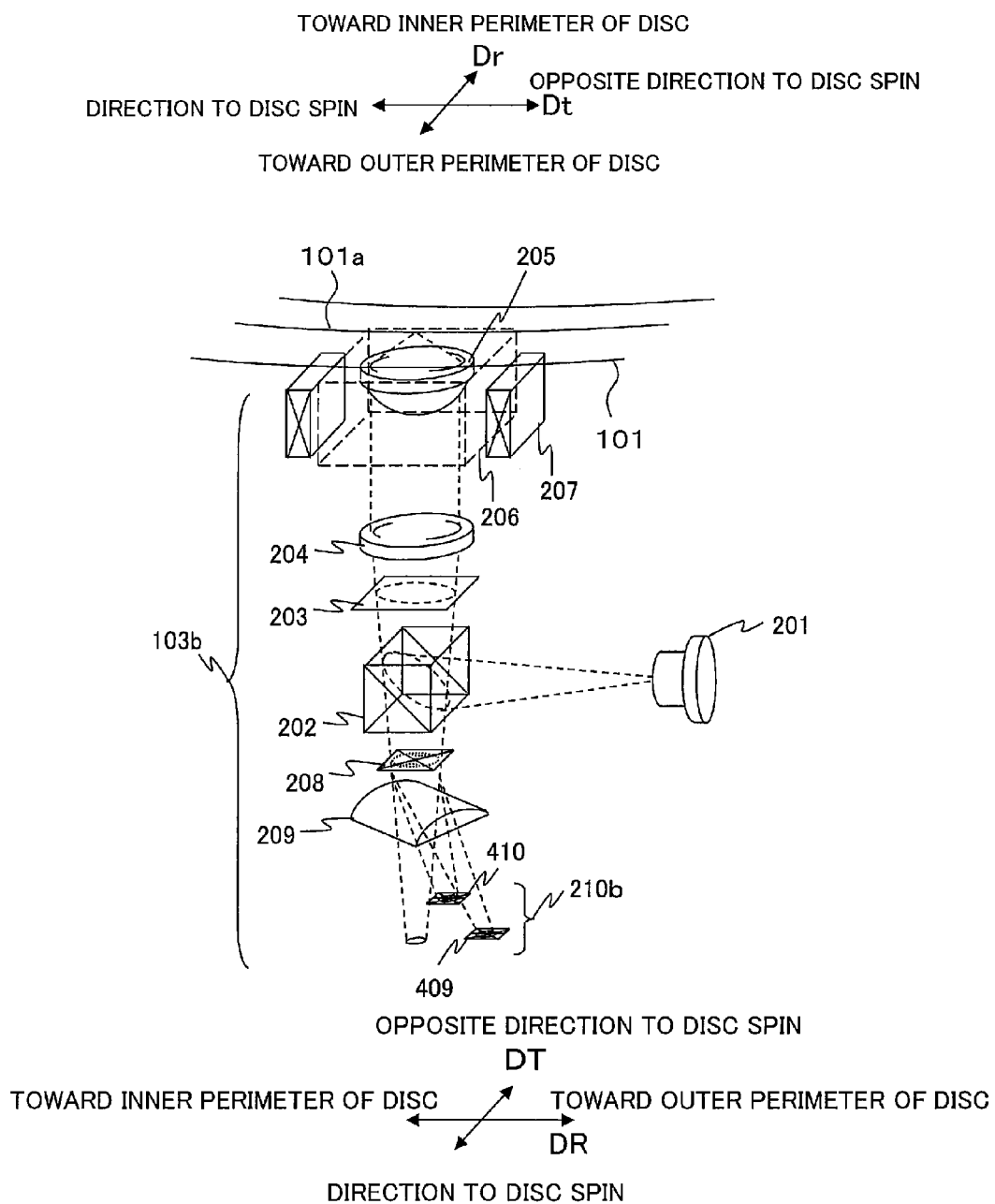
FIG. 13 is a perspective view schematically showing the structure of an optical head device according to the third embodiment.

FIG. 13 is a perspective view schematically showing the structure of the optical head device 103*b* according to the third embodiment of the invention. In FIG. 13, elements identical to or corresponding to elements shown in FIG. 2 are denoted by like reference characters. As shown in FIG. 13, the optical head device 103*b* includes a semiconductor laser 201, a polarizing beam splitter 202, a ¼-waveplate 203, a collimator lens 204, an objective lens 205, a movable holder 206, an objective lens actuator 207, a hologram 208, a cylindrical lens 209, and a photodetector 210*b*, as in the first embodiment. The photodetector 210*b* of the optical head device 103*b* according to the third embodiment has different light receiving sections 409, 410 from those of the photodetector 210 of the optical head device 103 according to the first embodiment. Accordingly, the drawings used in the description of the first embodiment will be referred to again in the description of the third embodiment.

The hologram 208 in the third embodiment is the same as in the first embodiment, as described with reference to FIGS. 3(*a*) and 3(*b*).

Figure 14:
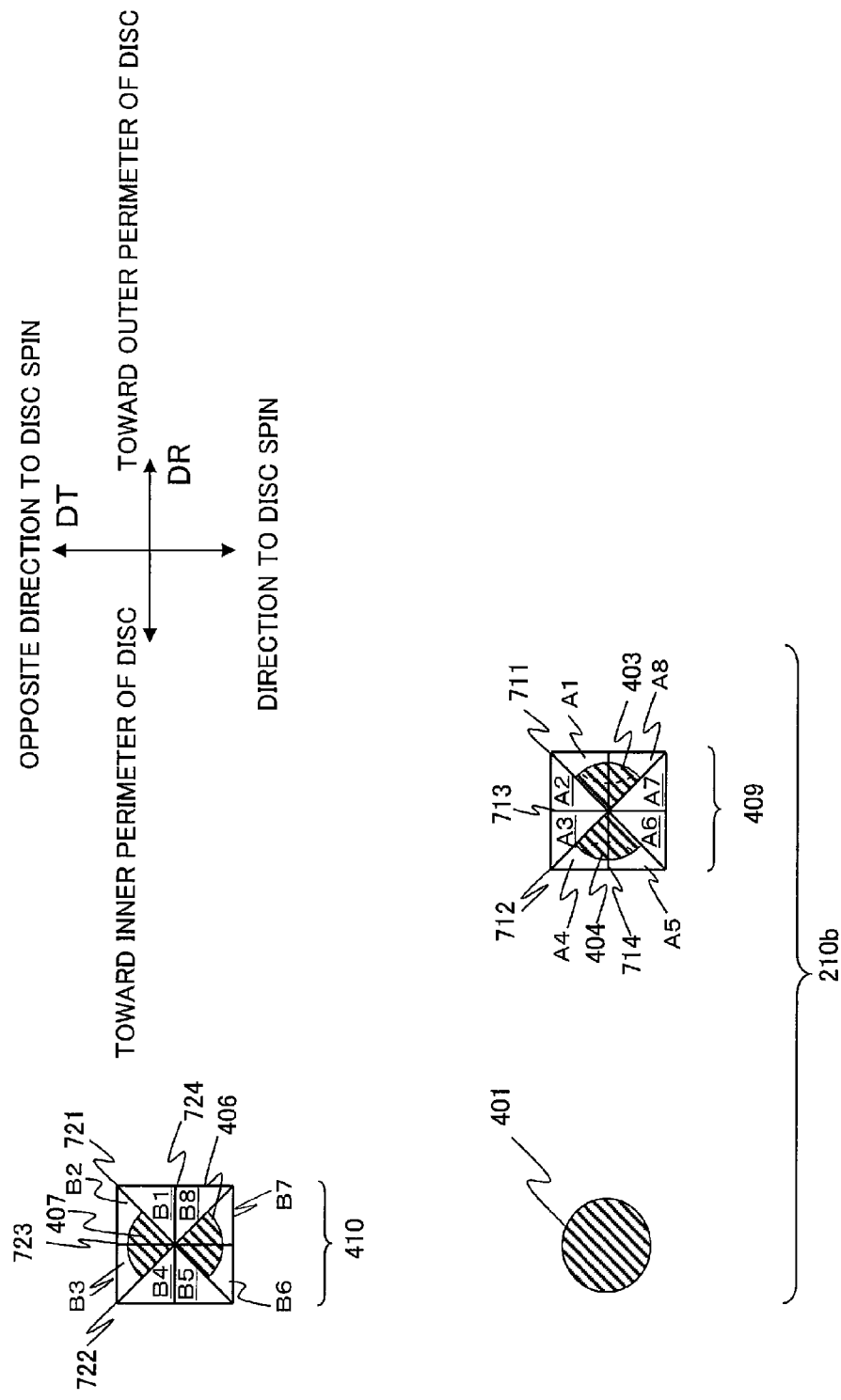
FIG. 14 schematically shows the light receiving surface of the photodetector in FIG. 13 and the regions illuminated by the light beam divided into five parts by the hologram (when the objective lens is not shifted in the radial direction).

FIG. 14 schematically shows the light receiving surface of the photodetector 210*b* in FIG. 13 and the regions illuminated by the light beam divided into five parts by the hologram 208 (when the objective lens 205 is not shifted in the radial direction Dr).

The photodetector 210*b* in the third embodiment differs from the photodetector 210 in the first embodiment in that it does not have a light receiving surface to receive a first light beam 401 consisting of the 0-order light in the diffracted light generated by the first diffraction region 301, second diffraction region 302, third diffraction region 303, and fourth diffraction region 304 of the hologram 208 (the 0-order light beam in the diffracted light generated by the hologram 208 by diffracting (transmitting) the 0-order light beam (main beam) in the reflected light diffracted by an information track 101*a* in the information recording layer to be recorded on or reproduced from on the optical disc 101).

The photodetector 210*b* includes a first light receiving section 409 having eight light receiving surfaces A1, A2, . . . , A8 that receive a second light beam 403 (fan-shaped hatched area), which is the +1-order light in the diffracted light generated by the first diffraction region 301 of the hologram 208, and a third light beam 404 (fan-shaped hatched area), which is the +1-order light in the diffracted light generated by the second diffraction region 302 of the hologram 208. The diffracted light to be used may instead be the −1-order light in the diffracted light generated by the first diffraction region

301 or second diffraction region 302 of the hologram 208. The shapes of the light receiving surfaces A1, A2, . . . , A8 may differ from the exemplary shapes shown.

The photodetector 210*b* further includes a second light receiving section 410 having eight light receiving surfaces B1, B2, . . . , B8 that receive a fourth light beam 406 (fan-shaped hatched area), which is the +1-order light in the diffracted light generated by the third diffraction region 303 of the hologram 208, and a fifth light beam 407 (fan-shaped hatched area), which is the +1-order light in the diffracted light generated by the fourth diffraction region 304 of the hologram 208. The diffracted light to be used may instead be the −1-order light in the diffracted light generated by the third diffraction region 303 or fourth diffraction region 304 of the hologram 208. The shapes of the light receiving surfaces B1, B2, . . . , B8 may differ from the exemplary shapes shown.

The photodetector 210*b* has sixteen light receiving surfaces, these being the eight light receiving surfaces A1, A2, . . . , A8 constituting the first light receiving section 409 and the eight light receiving surfaces B1, B2, . . . , B8 constituting the second light receiving section 410, but the shapes and positions of the light receiving surfaces and the number of light receiving surfaces may differ from the above.

If the direction DR corresponding to the radial direction Dr of the optical disc 101 is the 0-degree direction and the direction DT corresponding to the tangential direction Dt is the 90-degree direction, the light receiving surfaces A1, A2, . . . , A8 (first to eighth light receiving surfaces) of the first light receiving section 409 are bounded by lines including a line 714 (fifth line) extending in the direction DR corresponding to the radial direction Dr, a line 713 (sixth line) extending in the direction DT orthogonal to the direction DR corresponding to the radial direction Dr, a line 711 (third line) extending in the 45-degree direction, and a line 712 (fourth line) extending in the −45-degree direction.

If the direction DR corresponding to the radial direction Dr of the optical disc 101 is the 0-degree direction and the direction DT corresponding to the tangential direction Dt is the 90-degree direction, the eight light receiving surfaces B1, B2, . . . , B8 (ninth to sixteenth light receiving surfaces) of the second light receiving section 410 are bounded by lines including a line 724 (ninth line) extending in the direction DR corresponding to the radial direction Dr, a line 723 (tenth line) extending in the direction DT orthogonal to the direction DR corresponding to the radial direction Dr, a line 721 (seventh line) extending in the 45-degree direction, and a line 722 (eighth line) extending in the −45-degree direction.

The first light beam 401, which is the 0-order laser light generated by (passing through) the hologram 208, reaches the photodetector 210*b*, but since no light receiving surface is disposed in the position reached, the photodetector 210 does not output a signal based on the first light beam 401.

The second light beam 403, which is the +1-order light in the diffracted light generated by the first diffraction region 301 of the hologram 208, reaches light receiving surfaces A1 and A8 of the first light receiving section 409, and the third light beam 404, which is the +1-order light in the diffracted light generated by the second diffraction region 302 of the hologram 208, reaches light receiving surfaces A4 and A5 of the first light receiving section 409.

The fourth light beam 406, which is the +1-order light in the diffracted light generated by the third diffraction region 303 of the hologram 208, reaches light receiving surfaces B6 and B7 of the second light receiving section 410, and the fifth light beam 407, which is the +1-order light in the diffracted light generated by the fourth diffraction region 304 of the hologram 208, reaches light receiving surfaces B2 and B3 of the second light receiving section 410. In the description given below, the levels of the electrical signals photoelectrically converted by the light receiving surfaces A1, A2, ..., A8 and the light receiving surfaces B1, B2, ..., B8 (or the detected signals) will be denoted by reference characters a1, a2, ..., a8 and reference characters b1, b2, ..., b8, corresponding to the reference characters indicating the light receiving surfaces.

The matrix circuit 105 receives the signals a1, a2, ..., a8, b1, b2, ..., b8 detected by the photodetector 210b and generates a focus error signal FES by the astigmatism calculation given below.

FES=(a3+a4+a7+a8+b3+b4+b7+b8)−(a1+a2+a5+a6+b1+b2+b5+b6)

The matrix circuit 105 further generates a tracking error signal TES by the calculation given below TES=(a4+a5)−(a1+a8)−k×{(b3+b6)−(b2+b7)} where k is a constant.

Figure 15:
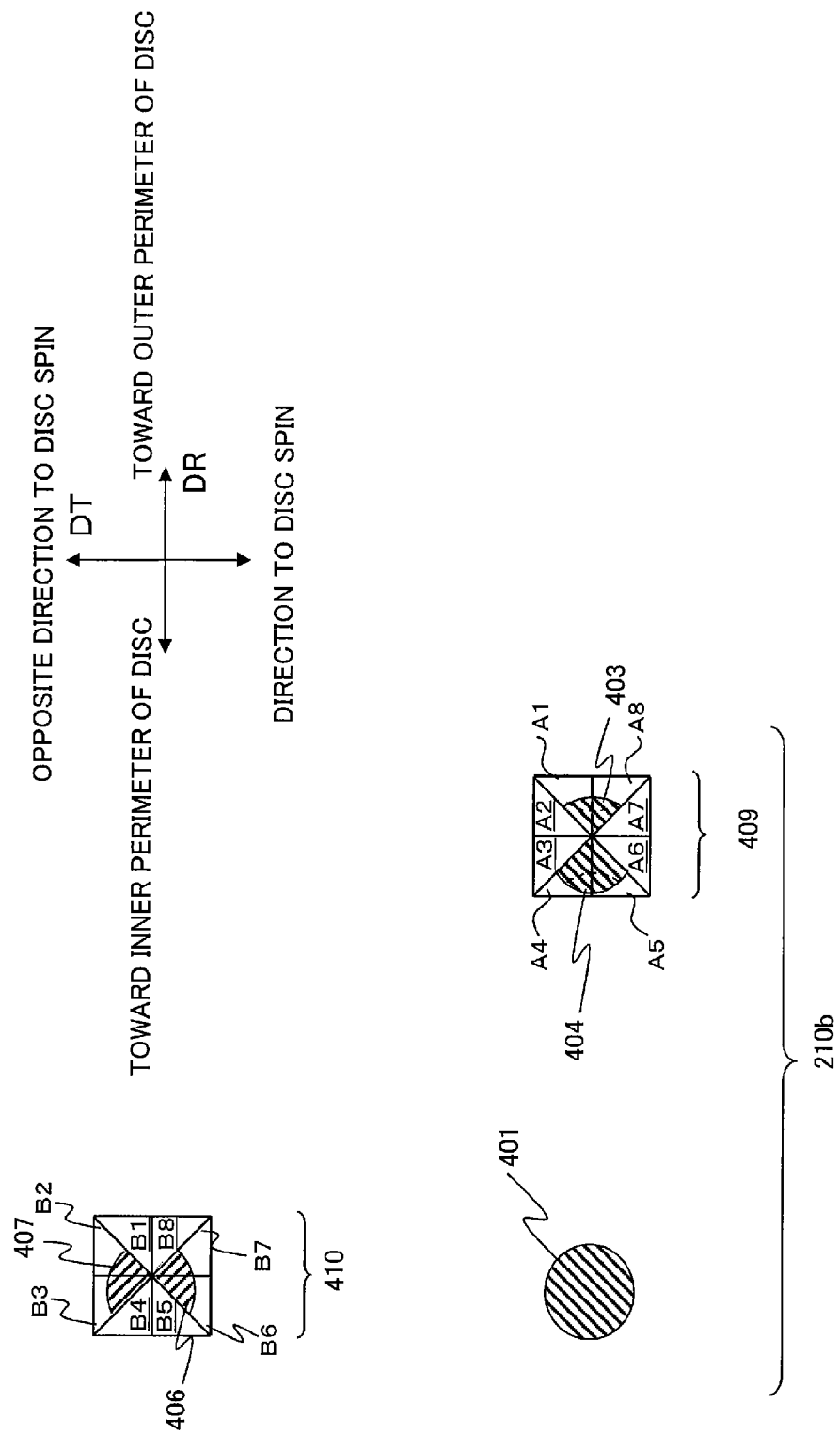
FIG. 15 schematically shows the light receiving surface of the photodetector in FIG. 13 and the regions illuminated by the light beam divided into five parts by the hologram (when the objective lens is shifted in the radial direction toward the inner perimeter of the optical disc).
Figure 16:
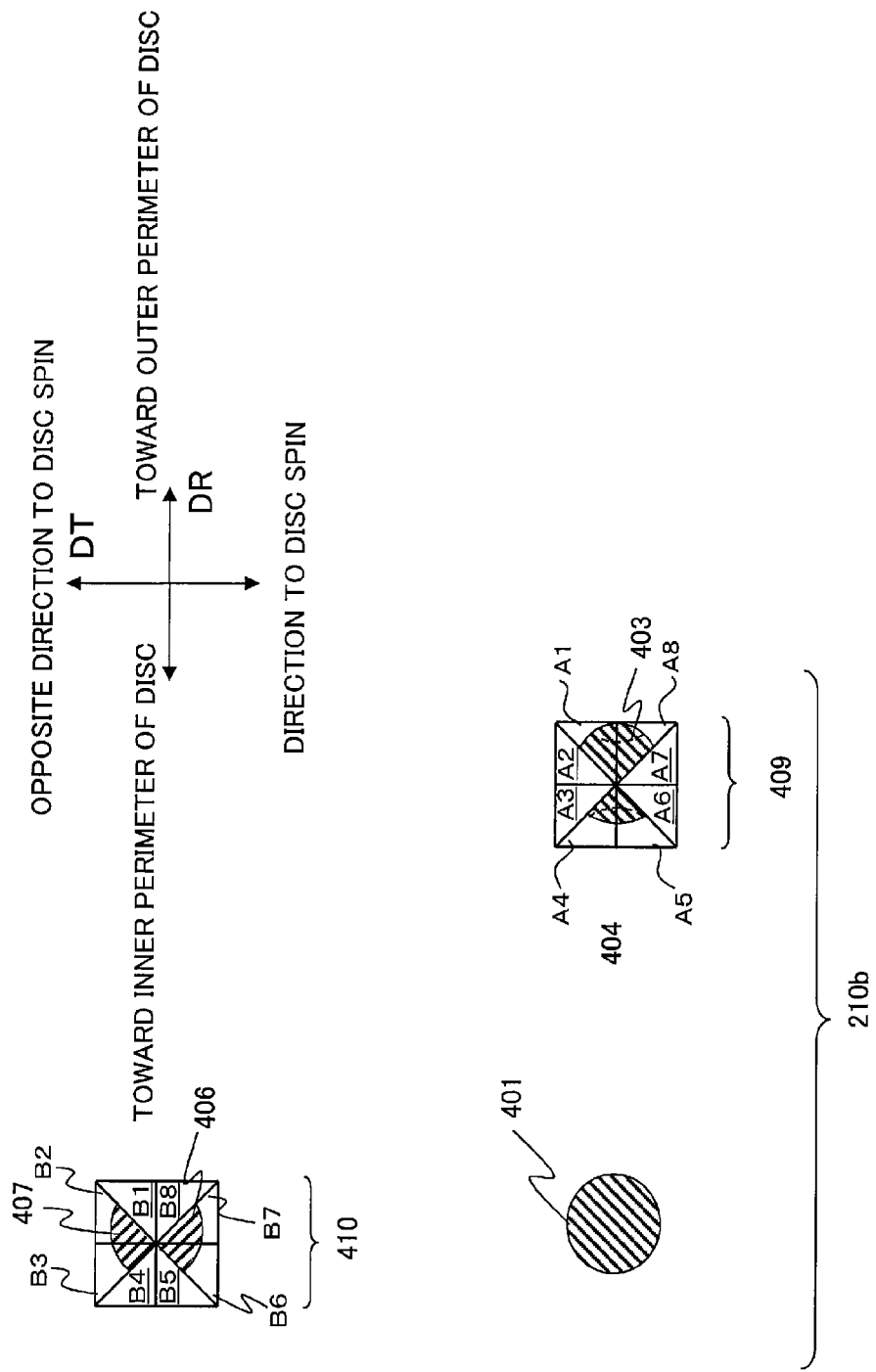
FIG. 16 schematically shows the light receiving surface of the photodetector in FIG. 13 and the regions illuminated by the light beam divided into five parts by the hologram (when the objective lens is shifted in the radial direction toward the outer perimeter of the optical disc).

FIG. 15 schematically shows the light receiving surface of the photodetector 210b in FIG. 13 and the regions illuminated by the five light beams 401, 403, 404, 406, 407 divided by the hologram 208 (when the objective lens 205 is shifted in the radial direction Dr toward the inner perimeter of the optical disc). FIG. 16 schematically shows the light receiving surface of the photodetector 210b in FIG. 13 and the regions illuminated by the five light beams 401, 403, 404, 406, 407 divided by the hologram 208 (when the objective lens 205 is shifted in the radial direction Dr toward the outer perimeter of the optical disc). FIG. 15 shows that the first to fifth light beams 401, 403, 404, 406, 407 are shifted to the left in FIG. 15 (in the direction DR corresponding to the radial direction Dr) when the objective lens 205 is shifted toward the inner perimeter of the optical disc 101. FIG. 16 shows that the first to fifth light beams 401, 403, 404, 406, 407 are shifted to the right in FIG. 16 (in the direction DR corresponding to the radial direction Dr or in the direction opposite to the direction in FIG. 15) when the objective lens 205 is shifted toward the outer perimeter of the optical disc 101.

Figure 17:
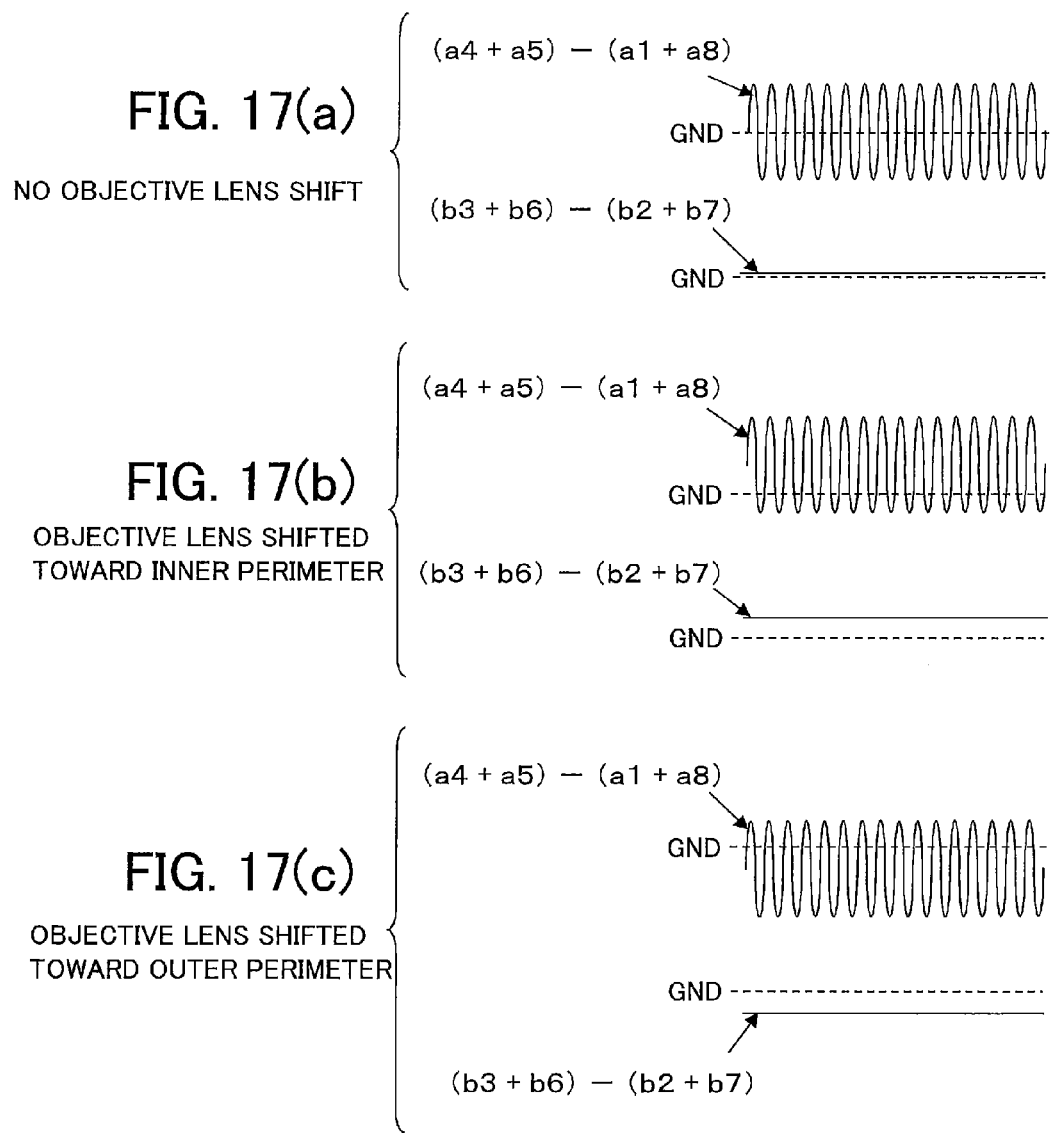
FIGS. 17(a), 17(b), and 17(c) show signals detected by the photodetector in FIG. 13 when the objective lens is not shifted in the radial direction, when the objective lens is shifted toward the inner perimeter of the optical disc, and when the objective lens is shifted toward the outer perimeter of the optical disc.

FIGS. 17(a), 17(b), and 17(c) show signals detected by the photodetector 210b in FIG. 3 when the objective lens 205 is not shifted in the radial direction Dr, when the objective lens 205 is shifted toward the inner perimeter of the optical disc, and when the objective lens 205 is shifted toward the outer perimeter of the optical disc. FIGS. 17(a), 17(b), and 17(c) show signals produced when the focus servo is on and the tracking servo is off.

As indicated by FIG. 17(a) and FIG. 14, when the objective lens 205 is not shifted in the radial direction Dr, the signal ((a4+a5)−(a1+a8)) has a push-pull waveform with no offset from GND (dotted line). At the same time, the signal ((b3+b6)−(b2+b7)) has a direct-current waveform (solid line) with no offset from GND (dotted line).

As indicated by FIG. 17(b) and FIG. 15, when the objective lens 205 is shifted in the radial direction Dr to the inner perimeter side (toward the inner perimeter), the signal ((a4+a5)−(a1+a8)) has a push-pull waveform with a positive offset from GND (dotted line). At the same time, the signal ((b3+b6)−(b2+b7)) has a direct-current waveform (solid line) with a positive offset from GND (dotted line). Therefore, the value of the signal ((b3+b6)−(b2+b7)) represents a value corresponding to the amount of shift of the objective lens 205. By subtracting the value of the signal ((b3+b6)−(b2+b7)) multiplied by a constant (k) from the value of the signal ((a4+a5)−(a1+a8)), an offset-cancelled tracking error signal TES can be obtained.

As indicated by FIG. 17(c) and FIG. 16, when the objective lens 205 is shifted in the radial direction Dr toward the outer perimeter side (toward the outer perimeter), the signal ((a4+a5)−(a1+a8)) has a push-pull waveform with a negative offset from GND (dotted line). At the same time, the signal ((b3+b6)−(b2+b7)) has a direct-current waveform (solid line) with a negative offset from GND (dotted line). Therefore, the value of the signal ((b3+b6)−(b2+b7)) represents a value corresponding to the amount of shift of the objective lens 205. By subtracting the value of the signal ((b3+b6)−(b2+b7)) multiplied by a constant from the value of the signal ((a4+a5)−(a1+a8)), an offset-cancelled tracking error signal TES can be obtained.

In place of the value of the signal ((b3+b6)−(b2+b7)) multiplied by a constant, the value of the signal (b3−b2) multiplied by a constant or the value of the signal (b6−b7) multiplied by a constant can be used.

Figure 18:
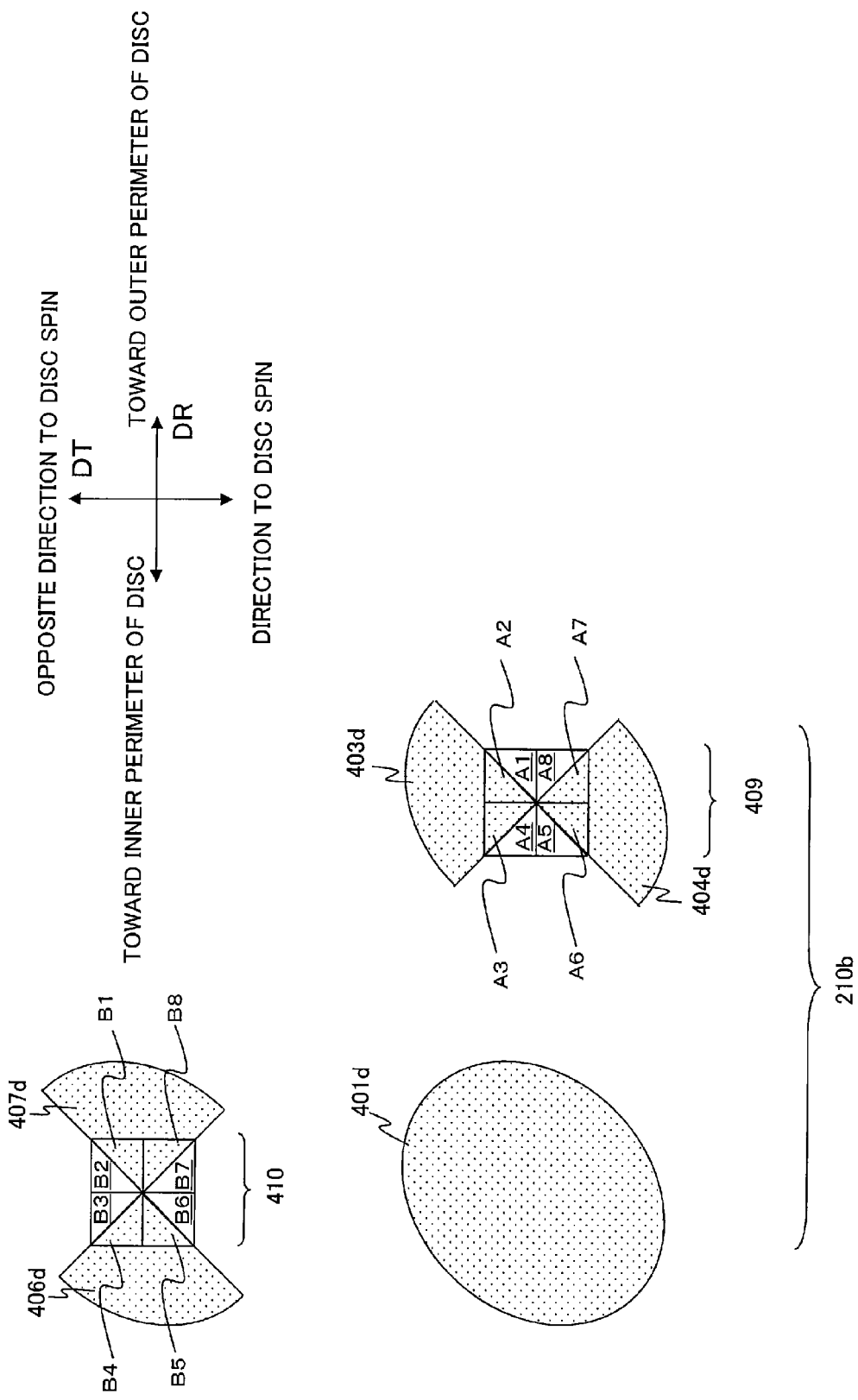
FIG. 18 schematically shows regions illuminated by the light beam reflected from the information recording layer one layer deeper (in a deeper position) than the information recording layer to be recorded on or reproduced from when information is recorded on or reproduced from a multilayer optical disc.
Figure 19:
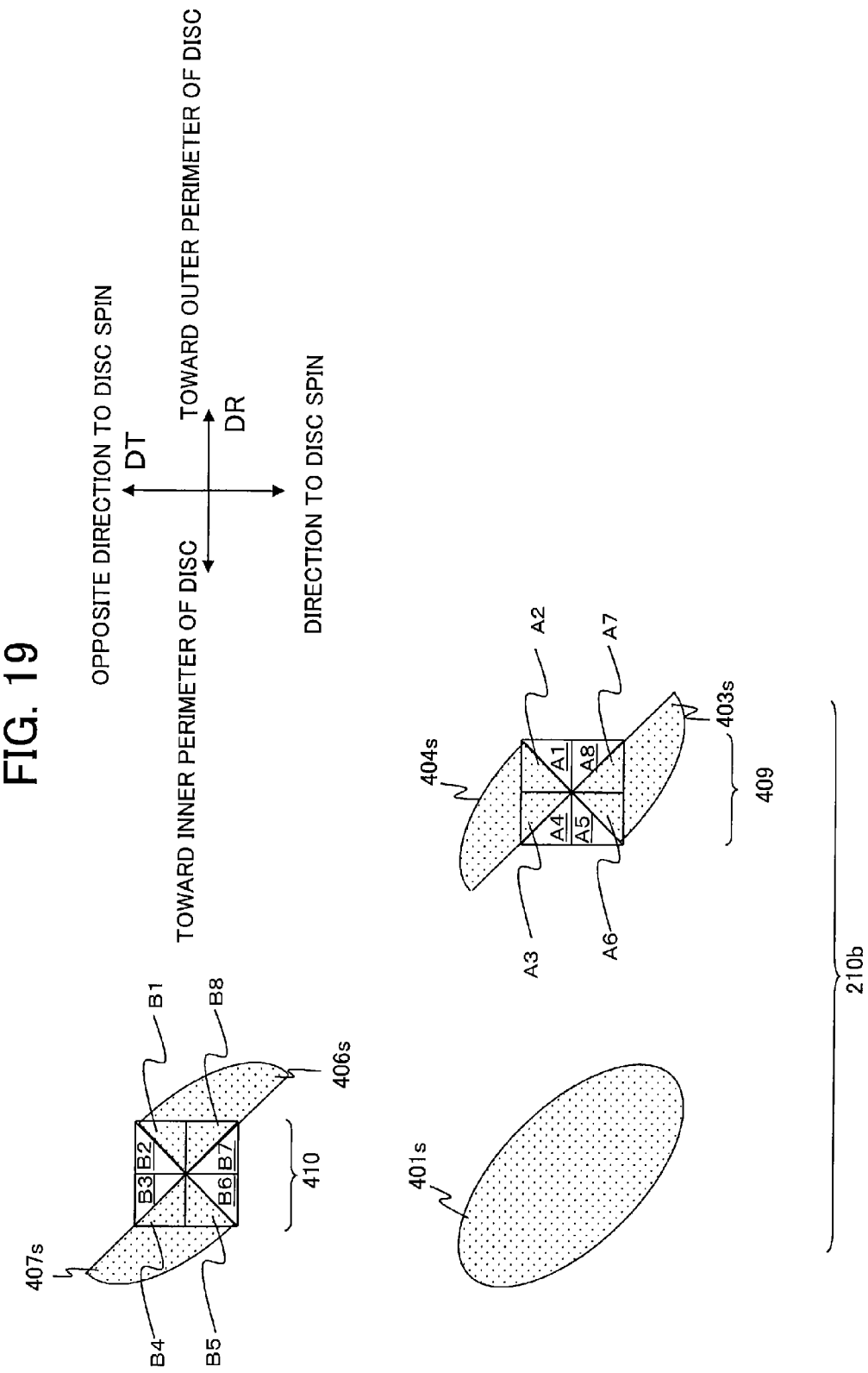
FIG. 19 schematically shows regions illuminated by the light beam reflected from the information recording layer one layer shallower (in a shallower position) than the information recording layer to be recorded on or reproduced from when information is recorded on or reproduced from a multilayer optical disc.

FIG. 18 schematically shows regions in the photodetector 210b illuminated by light beams reflected from the information recording layer one layer deeper (in a deeper position) than the information recording layer to be recorded on or reproduced from when information is recorded on or reproduced from a multilayer optical disc used as the optical disc 101. FIG. 19 schematically shows regions in the photodetector illuminated by light beams reflected from the information recording layer one layer shallower (in a shallower position) than the information recording layer to be recorded on or reproduced from when information is recorded on or reproduced from a multilayer optical disc used as the optical disc 101.

As shown in FIG. 18, the light beam reflected from the information recording layer one layer deeper (in a deeper position) than the information recording layer to be recorded on or reproduced from is divided into five parts by the hologram 208. A first light beam 401d consisting of the 0-order laser light generated by (passing through) the hologram 208 reaches the photodetector 210b in a blurred state. A second light beam 403d consisting of the +1-order light in the diffracted light generated by the first diffraction region 301 of the hologram 208 and a third light beam 404d consisting of the +1-order light in the diffracted light generated by the second diffraction region 302 of the hologram 208 reach light receiving surfaces A1, A4, A5, and A8 of the first light receiving section 409 but are not received there because of the effect of the astigmatism of the cylindrical lens 209. A fourth light beam 406d consisting of the +1-order light in the diffracted light generated by the third diffraction region 303 of the hologram 208 and a fifth light beam 407d consisting of the +1-order light in the diffracted light generated by the fourth diffraction region 304 of the hologram 208 reach light receiving surfaces B2, B3, B6, and B7 of the second light receiving section 410 but are not received there because of the effect of the astigmatism of the cylindrical lens 209.

The second light beam 403d and third light beam 404d from the hologram 208 reach light receiving surfaces A1, A4, A5, and A8 of the first light receiving section 409 but are not received there. Therefore, even if the regions illuminated by the second light beam 403d and third light beam 404d are shifted as shown in FIG. 15 or 16, the second light beam 403d and third light beam 404d do not fall upon light receiving surfaces A1, A4, A5, and A8 in the first light receiving section 409 and have no effect on the signals a1, a4, a5, a8.

The fourth light beam 406d and fifth light beam 407d from the hologram 208 reach light receiving surfaces B2, B3, B6, and B7 in the second light receiving section 410 but are not received there. Therefore, even if the regions illuminated by the fourth light beam 406d and fifth light beam 407d are shifted as shown in FIG. 15 or 16, the fourth light beam 406d and fifth light beam 407d do not fall upon light receiving surfaces B2, B3, B6, and B7 in the second light receiving section 410 and have no effect on the value of the tracking error signal given by TES=(a4+a5)−(a1+a8)−k×{(b3+b6)−(b2+b7)}.

Accordingly, a correct tracking error signal completely free of stray light components can be obtained.

As shown in FIG. 19, the light beam reflected from the information recording layer one layer shallower (in a shallower position) than the information recording layer to be recorded on or reproduced from is divided into five parts by the hologram 208. A first light beam 401s consisting of the 0-order laser light generated by (passing through) the hologram 208 reaches the photodetector 210b with its beam diameter widened. A second light beam 403s consisting of the +1-order light in the diffracted light generated by the first diffraction region 301 of the hologram 208 and a third light beam 404s consisting of the +1-order light in the diffracted light generated by the second diffraction region 302 of the hologram 208 reach light receiving surfaces A1, A4, A5, and A8 of the first light receiving section 409 but are not received there because of the effect of the astigmatism of the cylindrical lens 209. A fourth light beam 406s consisting of the +1-order light in the diffracted light generated by the third diffraction region 303 of the hologram 208 and a fifth light beam 407s consisting of the +1-order light in the diffracted light generated by the fourth diffraction region 304 of the hologram 208 reach light receiving surfaces B2, B3, B6, and B7 in the second light receiving section 410 but are not received there because of the effect of the astigmatism of the cylindrical lens 209.

The second light beam 403s and third light beam 404s from the hologram 208 reach light receiving surfaces A1, A4, A5, and A8 of the first light receiving section 409 but are not received there. Therefore, even if the regions illuminated by the second light beam 403s and third light beam 404s are shifted as shown in FIG. 15 or 16, the second light beam 403s and third light beam 404s do not fall upon light receiving surfaces A1, A4, A5, and A8 in the first light receiving section 409 and have no effect on the signals a1, a4, a5, a8.

The fourth light beam 406s and fifth light beam 407s from the hologram 208 reach light receiving surfaces B2, B3, B6, and B7 in the second light receiving section 410 but are not received there. Therefore, even if the regions illuminated by the fourth light beam 406s and fifth light beam 407s are shifted as shown in FIG. 15 or 16, the fourth light beam 406s and fifth light beam 407s do not fall upon light receiving surfaces B2, B3, B6, and B7 in the second light receiving section 410 and have no effect on the value of the tracking error signal given by TES=(a4+a5)−(a1+a8)−k×{(b3+b6)−(b2+b7)}.

Accordingly, a correct tracking error signal completely free of stray light components can be obtained.

The first light receiving section 409 and second light receiving section 410 should be disposed at a distance from the first light beams 401d, 401s such that when the beam diameters of the first light beams 401d, 401s are widened as shown in FIGS. 18 and 19 they will still not be received by the first light receiving section 409 or second light receiving section 410.

The first light receiving section 409 and second light receiving section 410 should also be disposed in such a manner that the second light receiving section 410 will not receive the second light beams 403d, 403s when their beam diameters are widened or the third light beams 404d, 404s when their beam diameters are widened and the first light receiving section 409 will not receive the fourth light beams 406d, 406s when their beam diameters are widened or the fifth light beams 407d, 407s when their beam diameters are widened.

In the third embodiment, as described above, the cylindrical lens 209 used as an optical element for producing astigmatism, the hologram 208 used as a diffractive element, and the photodetector 210b are configured in the following manner: the +1-order light or −1-order light in the diffracted light generated by the hologram 208 from the light reflected from an information track in the information recording layer to be recorded on or reproduced from on the optical disc 101 strikes inside light receiving surfaces A1, A4, A5, and A8 in the first light receiving section 409 and light receiving surfaces B2, B3, B6, and B7 in the second light receiving section 410; the +1-order light or −1-order light in the diffracted light generated by the hologram 208 from the light reflected from an information track in an information recording layer one layer deeper than the information recording layer to be recorded on or reproduced from on the optical disc 101 strikes outside light receiving surfaces A1, A4, A5, and A8 in the first light receiving section 409 and light receiving surfaces B2, B3, B6, and B7 in the second light receiving section 410; the +1-order light or −1-order light in the diffracted light generated by the hologram 208 from the light reflected from an information track in an information recording layer one layer shallower than the information recording layer to be recorded on or reproduced from on the optical disc 101 strikes outside light receiving surfaces A1, A4, A5, and A8 in the first light receiving section 409 and light receiving surfaces B2, B3, B6, and B7 in the second light receiving section 410. Therefore, the optical head device 103b or optical disc device 3 according to the third embodiment can eliminate the effect on the tracking error signal of the light beams reflected from information recording layers other than the information recording layer to be recorded on or reproduced from when information is recorded on or reproduced from a multilayer optical disc having a plurality of information recording layers containing information tracks. In other words, the effect on the tracking error signal of the light beams reflected from information recording layers other than the information recording layer to be recorded on or reproduced from can be eliminated by strategies involving the structure and disposition of the cylindrical lens 209, the structure and disposition of the hologram 208, and the positions and shapes of the light receiving surfaces of the plurality of light receiving sections of the photodetector 210b.

Variations

Figure 20:
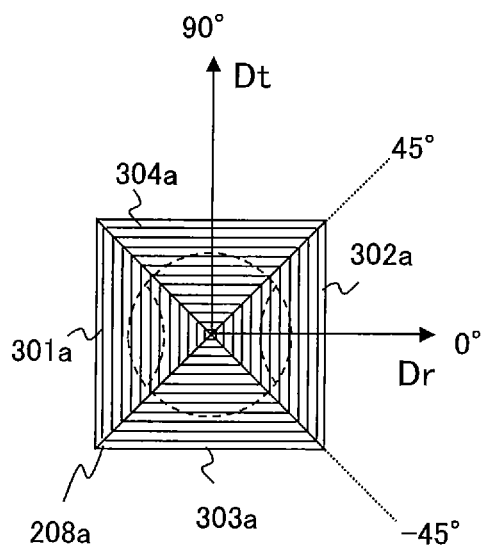
FIG. 20 is a plan view showing another example of the light receiving surface of the photodetectors in FIGS. 2, 10, and 14.

FIG. 20 is a plan view showing another example of the holograms in FIGS. 2, 10, and 13. In the hologram 208a shown in FIG. 20, both the first diffraction grating 301a and the second diffraction grating 302a have a plurality of linear grating patterns (grating structures) extending in the tangential direction Dt and arrayed in the radial direction Dr. As also shown in FIG. 20, both the third diffraction grating 303a and the fourth diffraction grating 304a have a plurality of linear grating patterns extending in the radial direction Dr and arrayed in the tangential direction Dt. In this variation, the disposition of the light receiving sections of the photodetector 210 must be changed so that they operate in a way equivalent to the way illustrated in FIGS. 4 to 9.

Figure 21:
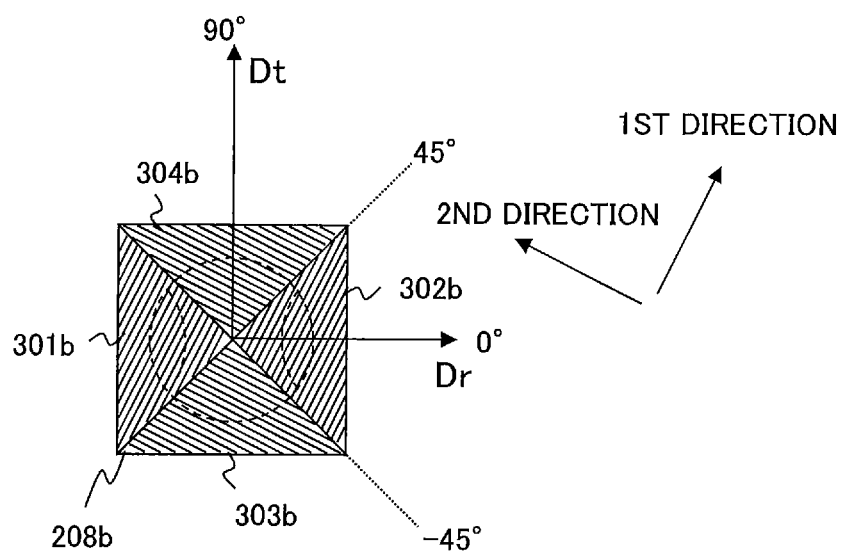
FIG. 21 is a plan view showing yet another example of the light receiving surface of the photodetectors in FIGS. 2, 10, and 14.

FIG. 21 is a plan view showing still another example of the holograms in FIGS. 2, 10, and 13. In the hologram 208b shown in FIG. 21, both the first diffraction grating 301b and the second diffraction grating 302b have a plurality of linear grating patterns extending in a given first direction at an angle greater than +45 degrees but less than +90 degrees and arrayed in a second direction orthogonal to the first direction. As shown in FIG. 21, both the third diffraction grating 303b and the fourth diffraction grating 304b have a plurality of linear grating patterns that extend in a given third direction at an angle in the range from 0 to −45 degrees and are arrayed in a fourth direction orthogonal to the third direction. In this variation, the light receiving sections of the photodetector 210 must be positioned to operate in a way equivalent to the way illustrated in FIGS. 4 to 9.

By forming the holograms shown in FIGS. 20 and 21 in proper accordance with the positions of the light receiving surfaces of the photodetector 210, the same effect as produced by the first or second embodiment can be obtained.

REFERENCE CHARACTERS 1, 2, 3 optical disc device; 101 optical disc; 101a information track; 102 spindle motor; 103, 103a, 103b optical head device; 104 motor; 105 matrix circuit; 106 signal reproduction circuit; 107 servo circuit; 108 spindle control circuit; 109 laser control circuit; 110 sled control circuit; 111 controller; 112 turntable; 201 semiconductor laser; 202 polarizing beam splitter; 203 ¼-waveplate; 204 collimator lens; 205 objective lens; 206 movable holder; 207 objective lens actuator; 208 hologram (diffractive element); 209 cylindrical lens; 210, 210a, 210b photodetector; 301 first diffraction region; 302 second diffraction region; 303 third diffraction region; 304 fourth diffraction region; 401 first light beam (light reflected from the information layer to be recorded on or reproduced from); 402 first light receiving section; 403 second light beam (light reflected from the information layer to be recorded on or reproduced from); 404 third light beam (light reflected from the information layer to be recorded on or reproduced from); 405 second light receiving section; 406 fourth light beam (light reflected from the information layer to be recorded on or reproduced from); 407 fifth light beam (light reflected from the information layer to be recorded on or reproduced from); 408 third light receiving section; 409 first light receiving section; 410 second light receiving section; 401d first light beam (light reflected from the information layer one layer deeper than the information recording layer to be recorded on or reproduced from); 403d second light beam (light reflected from the information layer one layer deeper than the information recording layer to be recorded on or reproduced from); 404d third light beam (light reflected from the information layer one layer deeper than the information recording layer to be recorded on or reproduced from); 406d fourth light beam (light reflected from the information layer one layer deeper than the information recording layer to be recorded on or reproduced from); 407d fifth light beam (light reflected from the information layer one layer deeper); 401s first light beam (light reflected from the information layer one layer shallower than the information recording layer to be recorded on or reproduced from); 403s second light beam (light reflected from the information layer one layer shallower than the information recording layer to be recorded on or reproduced from); 404s third light beam (light reflected from the information layer one layer shallower than the information recording layer to be recorded on or reproduced from); 406s fourth light beam (light reflected from the information layer one layer shallower than the information recording layer to be recorded on or reproduced from); 407s fifth light beam (light reflected from the information layer one layer shallower than the information recording layer to be recorded on or reproduced from); 801 flat beam splitter; A, B, C, D, G1, G2, H1, H2, A1, . . . , A8, B1, . . . , B8 light receiving surface; Dr radial direction; Dt tangential direction; DR direction corresponding to the radial direction; DT direction corresponding to the tangential direction.

What is claimed is:

1. An optical head device comprising:
a laser light source for emitting laser light;
an objective lens for focusing the laser light onto an information track in an information recording layer of an optical disc and focusing reflected light diffracted by the information track;
a diffractive element for generating diffracted light from the reflected light focused by the objective lens;
an optical element for producing astigmatism in the reflected light; and
a photodetector for receiving the reflected light; wherein
the diffractive element includes a plurality of diffraction regions separated by a first line intersecting, at a +45-degree angle, a line extending in a radial direction of the optical disc and a second line intersecting, at a −45-degree angle, the line extending in the radial direction of the optical disc, the plurality of diffraction regions including first and second diffraction regions having first grating patterns extending in mutually identical directions and third and fourth diffraction regions having second grating patterns extending in mutually identical directions;
the photodetector has
first to eighth light receiving surfaces bounded by a third line intersecting, at a +45-degree angle, a line extending in a direction corresponding to the radial direction, a fourth line intersecting, at a −45-degree angle, the line extending in the direction corresponding to the radial direction, a fifth line extending in the direction corresponding to the radial direction, a sixth line extending in the direction corresponding to a tangential direction of the optical disc, and the first to eighth light receiving surfaces being arranged so as to receive +1-order light in the diffracted light from the first and second diffraction regions, and
ninth to sixteenth light receiving surfaces bounded by a seventh line intersecting, at a +45-degree angle, a line extending in a direction corresponding to the radial direction, an eighth line intersecting, at a −45-degree angle, the line extending in the direction corresponding to the radial direction, a ninth line extending in the direction corresponding to the radial direction, and a tenth line extending in the direction corresponding to the tangential direction, and the ninth to sixteenth light receiving surfaces being arranged so as to receive +1-order light in the diffracted light from the third and fourth diffraction regions;
the first to sixteenth light receiving surfaces constitute a light receiving surface for detecting focus error, and a plurality of light receiving surfaces having a side being in contact with the line extending in the direction corresponding to the radial direction among the first to eighth light receiving surfaces and a plurality of light receiving surfaces having a side being in contact with the line extending in the direction corresponding to the tangential direction among the ninth to sixteenth light receiving surfaces constitute the light receiving surface for detecting the tracking error; and the optical element, the diffractive element, and the photodetector are configured in such a way that +1-order light or −1-order light in the diffracted light generated by the diffractive element from reflected light from an information track in an information recording layer where information is to be recorded or reproduced strikes inside the light receiving surface for detecting the tracking error signal, +1-order light or −1-order light in the diffracted light generated by the diffractive element from reflected light from an information track in an information recording layer one layer deeper than the information recording layer where information is to be recorded or reproduced strikes outside the light receiving surface for detecting the tracking error signal, and +1-order light or −1-order light in the diffracted light generated by the diffractive element from reflected light from an information track in an information recording layer one layer shallower than the information recording layer where information is to be recorded or reproduced strikes outside the light receiving surface for detecting the tracking error signal.

2. The optical head device of claim 1, wherein:

the light receiving sections for detecting tracking error includes a first light receiving section for detecting tracking error and a second light receiving section for detecting tracking error;

the first light receiving section for detecting tracking error includes the first light receiving surface and the fifth light receiving surface bounded by the third line and the fifth line, the first light receiving surface being disposed on an outer perimeter side in the direction corresponding to the radial direction and the fifth light receiving surface being disposed on an inner perimeter side in the direction corresponding to the radial direction, and the eighth light receiving surface and the fourth light receiving surface bounded by the fourth line and the fifth line, the eighth light receiving surface being disposed on the outer perimeter side in the direction corresponding to the radial direction and the fourth light receiving surface being disposed on the inner perimeter side in the direction corresponding to the radial direction;

the second light receiving section for detecting tracking error includes the second light receiving surface and the sixth light receiving surface bounded by the seventh line and the tenth line, the second light receiving surface being disposed on a side opposite to a direction of disc spin in the direction corresponding to the tangential direction and the sixth light receiving surface being disposed on a side disposed in the direction of disc spin in the direction corresponding to the tangential direction, and the third light receiving surface and the seventh light receiving surface bounded by the fourth line and the tenth line, the third light receiving surface being disposed on the side opposite to the direction of disc spin in the direction corresponding to the tangential direction and the seventh light receiving surface being disposed on the side disposed in the direction of disc spin in the direction corresponding to the tangential direction;

the light receiving section for detecting focus error includes a first light receiving section for detecting focus error and a second light receiving section for detecting focus error;

the first light receiving section for detecting focus error includes the first, fourth, fifth, and eighth light receiving surfaces, the second light receiving surface and the sixth light receiving surface bounded by the third line and the sixth line, the second light receiving surface being disposed on the side opposite to the direction of disc spin in the direction corresponding to the tangential direction and the sixth light receiving surface being disposed on the side disposed in the direction of disc spin in the direction corresponding to the tangential direction, and the third light receiving surface and the seventh light receiving surface bounded by the fourth line and the sixth line, the third light receiving surface being disposed on the side opposite to the direction of disc spin in the direction corresponding to the tangential direction and the seventh light receiving surface being disposed on the side disposed in the direction of disc spin in the direction corresponding to the tangential direction;

the second light receiving section for detecting focus error includes the tenth, eleventh, fourteenth, and fifteenth light receiving surfaces, the ninth light receiving surface and the thirteenth light receiving surface bounded by the seventh line and the ninth line, the ninth light receiving surface being disposed on an outer perimeter side in the direction corresponding to the radial direction and the thirteenth light receiving surface being disposed on an inner perimeter side in the direction corresponding to the radial direction, and the sixteenth light receiving surface and the twelfth light receiving surface bounded by the eighth line and the ninth line, the sixteenth light receiving surface being disposed on the outer perimeter side in the direction corresponding to the radial direction and the twelfth light receiving surface being disposed on the inner perimeter side in the direction corresponding to the radial direction.

3. The optical head device of claim 2, wherein if levels of signals obtained from the first to sixteenth light receiving surfaces are respectively denoted $a1, a2, a3, a4, a5, a6, a7, a8, b1, b2, b3, b4, b5, b6, b7, b8$, the focus error signal is obtained by the calculation given below $$(a3+a4+a7+a8+b3+b4+b7+b8)-(a1+a2+a5+a6+b1+b2+b5+b6)$$

and the tracking error signal is obtained by the calculation given below $$(a4+a5)-(a1+a8)-k\times\{(b3+b6)-(b2+b7)\}$$

where k is a constant.

4. The optical head device of claim 1, wherein the optical element is a cylindrical lens.

5. The optical head device of claim 1, wherein the optical element is a flat beam splitter.

6. An optical disc device comprising:

a disc drive unit for spinning an optical disc; and an optical head device for reading information from the spinning optical disc or writing information on the spinning optical disc; wherein the optical head device includes a laser light source for emitting laser light;

an objective lens for focusing the laser light onto an information track in an information recording layer of an optical disc and focusing reflected light diffracted by the information track, a diffractive element for generating diffracted light from the reflected light focused by the objective lens, an optical element for producing astigmatism in the reflected light, and a photodetector for receiving the reflected light;

the diffractive element includes a plurality of diffraction regions separated by a first line intersecting, at a +45-degree angle, a line extending in a radial direction of the optical disc and a second line intersecting, at a −45-degree angle, the line extending in the radial direction of the optical disc, the plurality of diffraction regions including first and second diffraction regions having first grating patterns extending in mutually identical directions and third and fourth diffraction regions having second grating patterns extending in mutually identical directions;

the photodetector has first to eighth light receiving surfaces bounded by a third line intersecting, at a +45-degree angle, a line extending in a direction corresponding to the radial direction, a fourth line intersecting, at a −45-degree angle, the line extending in the direction corresponding to the radial direction, a fifth line extending in the direction corresponding to the radial direction, a sixth line extending in the direction corresponding to a tangential direction of the optical disc, and the first to eighth light receiving surfaces being arranged so as to receive +1-order light in the diffracted light from the first and second diffraction regions, and ninth to sixteenth light receiving surfaces bounded by a seventh line intersecting, at a +45-degree angle, a line extending in a direction corresponding to the radial direction, an eighth line intersecting, at a −45-degree angle, the line extending in the direction corresponding to the radial direction, a ninth line extending in the direction corresponding to the radial direction, and a tenth line extending in the direction corresponding to the tangential direction, and the ninth to sixteenth light receiving surfaces being arranged so as to receive +1-order light in the diffracted light from the third and fourth diffraction regions;

the first to sixteenth light receiving surfaces constitute a light receiving surface for detecting focus error, and a plurality of light receiving surfaces having a side being in contact with the line extending in the direction corresponding to the radial direction among the first to eighth light receiving surfaces and a plurality of light receiving surfaces having a side being in contact with the line extending in the direction corresponding to the tangential direction among the ninth to sixteenth light receiving surfaces constitute the light receiving surface for detecting the tracking error; and the optical element, the diffractive element, and the photodetector are configured in such a way that +1-order light or −1-order light in the diffracted light generated by the diffractive element from reflected light from an information track in an information recording layer where information is to be recorded or reproduced strikes inside the light receiving surface for detecting the tracking error signal, +1-order light or −1-order light in the diffracted light generated by the diffractive element from reflected light from an information track in an information recording layer one layer deeper than the information recording layer where information is to be recorded or reproduced strikes outside the light receiving surface for detecting the tracking error signal, and +1-order light or −1-order light in the diffracted light generated by the diffractive element from reflected light from an information track in an information recording layer one layer shallower than the information recording layer where information is to be recorded or reproduced strikes outside the light receiving surface for detecting the tracking error signal.

* * * * *